(12) United States Patent
Tanaka et al.

(10) Patent No.: US 9,100,332 B2
(45) Date of Patent: Aug. 4, 2015

(54) DATA TRANSMITTING DEVICE, DATA COMMUNICATING DEVICE, AND COMPUTER READABLE MEDIUM

(75) Inventors: Shingo Tanaka, Yokohama (JP); Takahiro Yamaura, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 61 days.

(21) Appl. No.: 13/234,572

(22) Filed: Sep. 16, 2011

(65) Prior Publication Data

US 2012/0218914 A1    Aug. 30, 2012

(30) Foreign Application Priority Data

Feb. 28, 2011    (JP) ................................. 2011-042605

(51) Int. Cl.
*H04L 12/56* (2006.01)
*H04L 12/801* (2013.01)
*H04L 1/18* (2006.01)

(52) U.S. Cl.
CPC .............. *H04L 47/34* (2013.01); *H04L 1/1874* (2013.01)

(58) Field of Classification Search
CPC ............................ G06F 13/4027; H04L 43/50
USPC ..................... 370/250–260; 709/234; 711/147
See application file for complete search history.

(56) References Cited

U.S. PATENT DOCUMENTS

| | | | | |
|---|---|---|---|---|
| 5,937,169 A * | 8/1999 | Connery et al. | ............... | 709/250 |
| 6,058,251 A * | 5/2000 | Okamoto et al. | ............. | 710/107 |
| 6,278,691 B1 * | 8/2001 | Ohyama et al. | ............... | 370/235 |
| 6,697,868 B2 * | 2/2004 | Craft et al. | ..................... | 709/230 |
| 7,313,148 B2 * | 12/2007 | Chu et al. | ........................ | 370/419 |
| 7,475,170 B2 * | 1/2009 | Inagaki et al. | ................... | 710/52 |
| 7,965,698 B2 * | 6/2011 | Jung | ............................. | 370/349 |
| 2004/0078462 A1 * | 4/2004 | Philbrick et al. | .............. | 709/224 |
| 2004/0095883 A1 * | 5/2004 | Chu et al. | ....................... | 370/235 |
| 2004/0100952 A1 * | 5/2004 | Boucher et al. | ............... | 370/389 |

(Continued)

FOREIGN PATENT DOCUMENTS

| | | |
|---|---|---|
| JP | 10-164176 | 6/1998 |
| JP | 2007-142582 A | 6/2007 |

(Continued)

OTHER PUBLICATIONS

Japanese Office Action for Japanese Application No. 2011-042605 mailed on Feb. 8, 2013.

(Continued)

*Primary Examiner* — Nicholas Jensen
*Assistant Examiner* — Berhanu Belete
(74) *Attorney, Agent, or Firm* — Amin, Turocy & Watson, LLP

(57) ABSTRACT

A data transmitting device divides application data into packets, transmits the packets, and continuously carries out packet transmission while receiving acknowledgement from a receiving device of the transmitted packets. The application data to be transmitted is stored in a data storage area of a data storage unit. The data is read from the data storage area, a sequence number is set, and the data is transmitted as the packet. If the read data is within a predetermined length from an end of the application data, a copy of the read data is saved in a temporary buffer area of the data storage unit. When data of a sequence number before that of first data of next application data is to be transmitted after transmission of the next application data is started, the data is read from the temporary buffer area of the data storage unit.

20 Claims, 17 Drawing Sheets

(56) References Cited

U.S. PATENT DOCUMENTS

| | | |
|---|---|---|
| 2006/0184664 A1* | 8/2006 | Jung .............................. 709/224 |
| 2006/0212661 A1* | 9/2006 | Inagaki et al. ................ 711/147 |
| 2009/0248891 A1* | 10/2009 | Tanaka .......................... 709/234 |

FOREIGN PATENT DOCUMENTS

| | | |
|---|---|---|
| JP | 2008-278410 | 11/2008 |
| JP | 2009-077024 | 4/2009 |
| JP | 2009-088962 | 4/2009 |
| JP | 2011-019150 A | 1/2011 |
| WO | 2011016087 A1 | 2/2011 |
| WO | 2011033562 A1 | 3/2011 |

OTHER PUBLICATIONS

Japanese Office Action for Japanese Patent Application No. 2013-081367 mailed on Dec. 13, 2013.
Office Action of Decision of Rejection for Japanese Patent Application No. 2013-081367 Dated Jul. 29, 2014, 4 pgs.

* cited by examiner

NAMES AND DESCRIPTION OF STATES OF TCP

| NAMES OF STATE | DESCRIPTION |
|---|---|
| LISTEN | WAITING FOR CONNECTION |
| SYN-SENT | WAITING FOR CONNECTION REQUEST AFTER TRANSMITTING CONNECTION REQUEST |
| SYN-RECEIVED | WAITING FOR CONNECTION REQUEST ACKNOWLEDGEMENT BETWEEN RECEPTION AND TRANSMISSION OF CONNECTION REQUEST |
| ESTABLISHED | CONNECTED |
| FIN-WAIT-1 | WAITING FOR CONNECTION TERMINATION REQUEST FROM PEER TERMINAL OR ACKNOWLEDGEMENT OF TRANSMITTED CONNECTION TERMINATION REQUEST |
| FIN-WAIT-2 | WAITING FOR CONNECTION TERMINATION REQUEST FROM PEER TERMINAL |
| CLOSE-WAIT | WAITING FOR CONNECTION TERMINATION REQUEST FROM LOCAL USER |
| CLOSING | WAITING FOR ACKNOWLEDGEMENT OF CONNECTION TERMINATION REQUEST FROM PEER TERMINAL |
| LAST-ACK | WAITING FOR ACKNOWLEDGEMENT OF TRANSMITTED CONNECTION TERMINATION REQUEST |
| TIME-WAIT | WAITING FOR RECEPTION OF ACKNOWLEDGEMENT OF CONNECTION TERMINATION REQUEST OF PEER TERMINAL |
| CLOSED | NO CONNECTION STATE |

ENTRIES OF SESSION INFORMATION

| MENBER | DESCRIPTION |
|---|---|
| LOCAL.ADDR | IP ADDRESS OF ITS OWN |
| FORIGN.ADFDR | IP ADDRESS OF PEER |
| LOCAL.PORT | PORT NUMBER OF ITS OWN |
| FORIGN.PORT | PORT NUMBER OF PEER |
| STATE | SESSION STATE |
| SND_UNA | TRANSMISSION-UNCONFIRMED SEQUENCE NUMBER |
| SND_NXT | SEQUENCE NUMBER TO BE TRANSMITTED NEXT |
| SND_WND | TRANSMITTED WINDOW |
| SND_UP | TRANSMITTING URGENT POINTER |
| SND_WL1 | SEQUENCE NUMBER OF SEGMENT USED UPON LAST WINDOW UPDATE |
| SND_WL2 | ACKNOWLEDGEMENT SEQUENCE NUMBER OF SEGMENT USED UPON LAST WINDOW UPDATE |
| RCV_NXT | SEQUENCE NUMBER TO BE RECEIVED NEXT |
| RCV_WND | RECEIVED WINDOW |
| RCV_UP | RECEIVING URGENT POINTER |
| FIN_RECV | RECEIVING STATUS OF "FIN" SEGMENT |
| FIN_SENT | TRANSMITTING STATUS OF "FIN" SEGMENT |
| FIN_SEQ | SEQUENCE NUMBER OF "FIN" SEGMENT |
| FIN_SENT | TRANSMITTING STATUS OF "RST" SEGMENT |
| RCV_SHUT | PROHIBIT RECEPCTION OF SEGMENT THEREAFTER |

US 9,100,332 B2

DATA TRANSMITTING DEVICE, DATA COMMUNICATING DEVICE, AND COMPUTER READABLE MEDIUM

CROSS REFERENCE TO RELATED APPLICATIONS

This application is based upon and claims the benefit of priority from the prior Japanese Patent Application No. 2011-42605, filed on Feb. 28, 2011, the entire contents of which are incorporated herein by reference.

FIELD

The present invention relates to data transmitting devices, data communicating devices, and a non-transitory computer readable medium for storing a program such as a communicating program.

BACKGROUND

Protocol processing of, for example, TCP/IP, which is widely used by the Internet and the like, has been conventionally realized mainly by software which operates in a CPU. However, along with an increase in the speed of recent networks, the TCP/IP processing load of CPUs has been increased, and a device realizing high-speed communication by using a TOE (TCP/IP Offload Engine) that carries out TCP/IP processing by dedicated hardware has been proposed.

A TOE is normally controlled by the software which operates in a CPU. However, when the control by the software is taken into consideration, there are problems, for example, that performance of data transmission is not exerted and that disconnection of a session is not normally operated.

BRIEF DESCRIPTION OF THE DRAWINGS

FIG. 6 is a drawing showing an example of application data and an acknowledgement with respect to that;

FIG. 7 is a drawing showing another example of the application data and the acknowledgement with respect to that;

FIG. 20 is a drawing showing names of the states of TCP and explanation thereof; and FIG. 21 is a drawing showing examples of session information.

DETAILED DESCRIPTION (First Embodiment)

Figure 1:
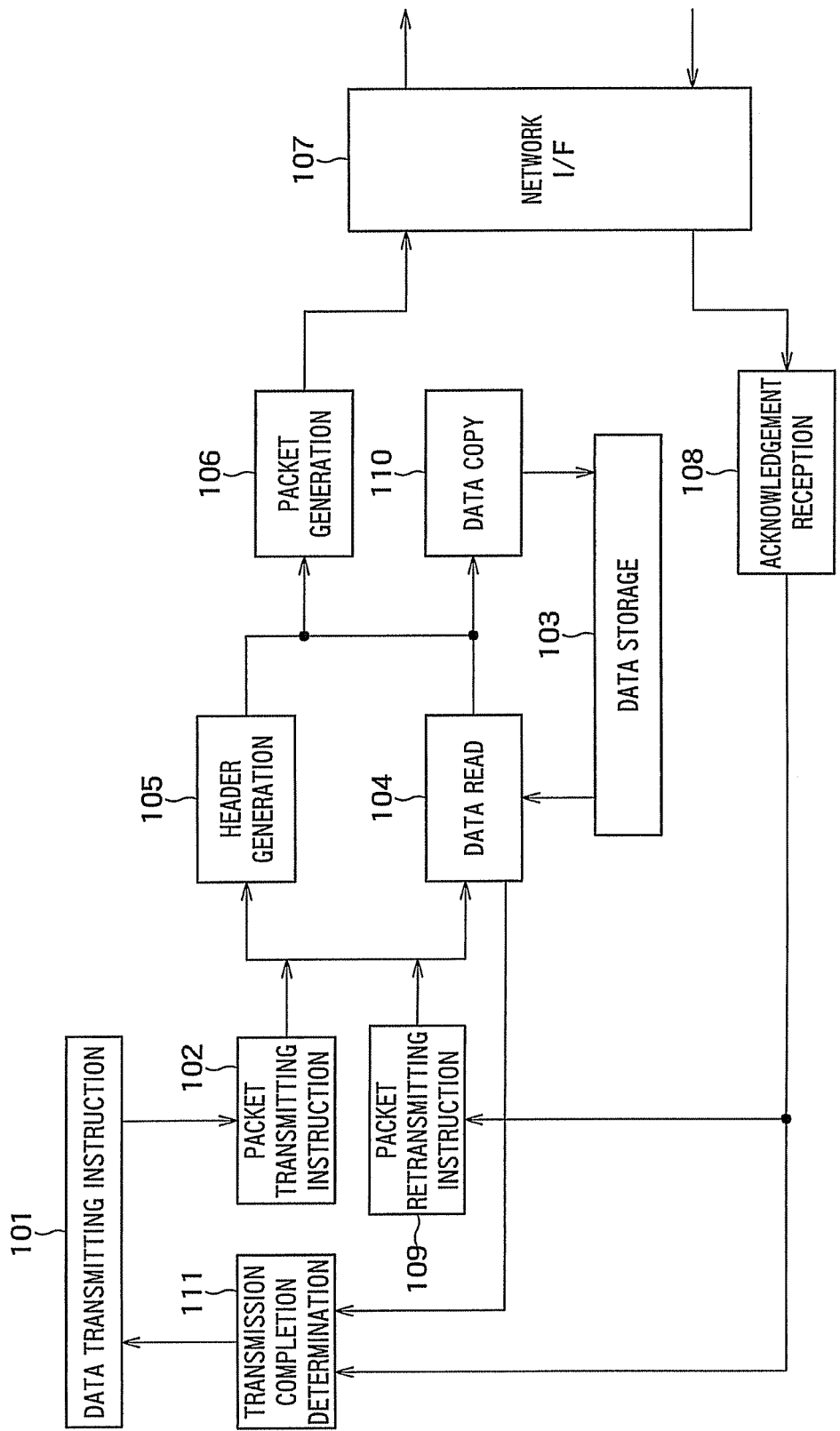
FIG. 1 is a drawing schematically showing a configuration of a data transmitting device according to a first embodiment.

According to one aspect of the present embodiment, there is provided a data transmitting device which divides application data into packets, transmit the packets, and continuously carry out packet transmission while receiving acknowledgement from a receiving device of the transmitted packets.

The data transmitting device includes a data transmission instructing unit, a data storage unit, a packet transmission instructing unit, a data reading unit, a data copying unit, a header generating unit, a packet generating unit, a network I/F unit, an acknowledgement receiving unit, a packet retransmission instructing unit and a transmission completion determining unit.

The data transmission instructing unit generates a transmitting instruction of the application data.

The data storage unit has a data area and a temporary buffer area and stores the application data to be transmitted in the data area.

The packet transmission instructing unit generates a packet transmitting instruction for continuously carrying out transmission of packets one packet at a time based on the transmitting instruction of the application data.

The data reading unit reads an amount of application data corresponding to one packet from the data area of the data storage unit based on the packet transmitting instruction.

The data copying unit, if the data read by the data reading unit is data within a predetermined length from an end of the application data, saves a copy of the read data in the temporary buffer area of the data storage unit.

The header generating unit generates a header containing sequence number information of the data to be contained in the packet to be transmitted based on the packet transmitting instruction.

The packet generating unit generates the packet based on the generated header and the read data.

The network I/F unit transmits the generated packet to the receiving device via a network.

The acknowledgement receiving unit receives an acknowledgement packet containing acknowledgement sequence number information indicating through which data has been received by the receiving device among data sequence of transmitted packets.

The packet retransmission instructing unit specifies data to be retransmitted according to the acknowledgement sequence number information and gives a retransmitting instruction of the specified data to the data reading unit and the header generating unit.

The transmission completion determining unit determines transmission completion of the application data at a point when the data reading unit has read the data to the end of the application data and the acknowledgement receiving unit has received the acknowledgement indicating that all of the data before the data within the predetermined length from the end of the application data has been received.

The transmission completion determining unit notifies the transmission completion to the data transmission instructing unit.

When the data transmission instructing unit receives notification of the transmission completion, the data transmission instructing unit generates a transmitting instruction of next application data.

When the data corresponding to a sequence number before a sequence number corresponding to first data of the next application data is to be transmitted after the transmitting instruction of the next application data is generated, the data reading unit reads the data from the temporary buffer area of the data storage unit.

The embodiment will be described below with reference to drawings.

Main protocols used by Internet communication include TCP/IP. Conventional TCP/IP is realized mainly by software processing and is operated by a CPU of, for example, a personal computer or an embedded device. In such a case, data exchange with networks is executed mainly by a NIC (Network Interface Card) provided with a MAC/PHY function or LSI such as a dedicated ASIC or FPGA (hereinafter, these are represented by NIC to give explanations).

In the case of reception, a received packet from a network is transferred from the NIC to a memory by DMA, and protocol processing is then carried out by protocol stack software of the CPU. In the case of transmission, a packet generated in the memory by the protocol stack software of the CPU is read by DMA transfer by the NIC and transmitted to the network. Normally, in the CPU, application processing is also executed other than the protocol processing, and memory copying is carried out by transmission/reception of data between a protocol stack and an application. The flow of the data thereof is illustrated as shown in FIG. 2.

Figure 2:
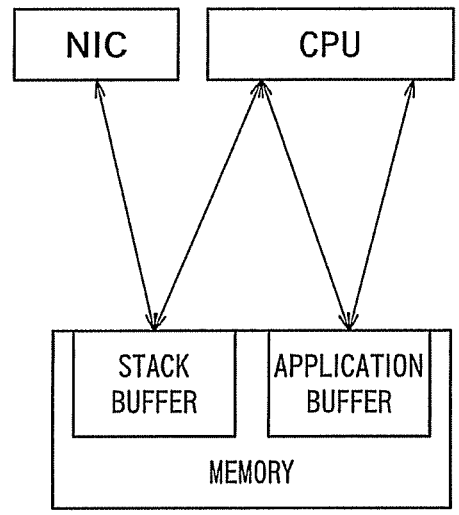
FIG. 2 is a drawing showing the state in which memory copy is carried out by transmission/reception of data between a protocol stack and an application.
Figure 3:
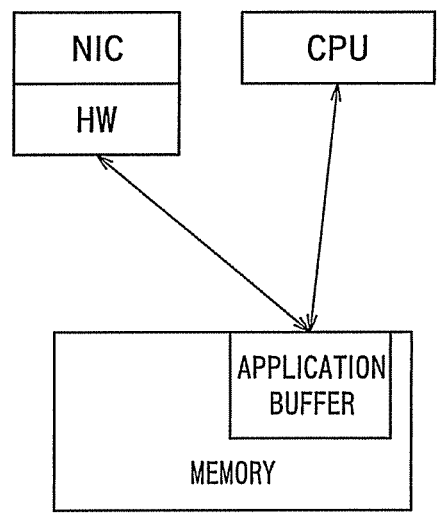
FIG. 3 is an explanatory drawing showing a method in which a NIC directly writes data to an application buffer.

As is understood from the illustration of FIG. 2, in such a method, data is once buffered between an application buffer and the NIC, wherein the data reciprocates over the memory two times in total. Therefore, a method in which the NIC directly writes data to the application buffer by carrying out part of protocol processing by the NIC has been conventionally proposed. The flow of data in this case is illustrated as shown in FIG. 3. As a result, the flow of data reciprocates over the memory only once; therefore, overhead in terms of performance and power consumption due to copy of data can be avoided. This process is an example of a receiving process; however, also in a transmitting process, it is also desirable to similarly carry out operation without carrying out memory copying.

However, when copying is simply omitted in a transmitting process in this manner, a problem is generated in the case in which Socket API is presupposed as an application API. Socket API has a restriction that not more than one piece of application data can be specified at one time.

Figure 4:
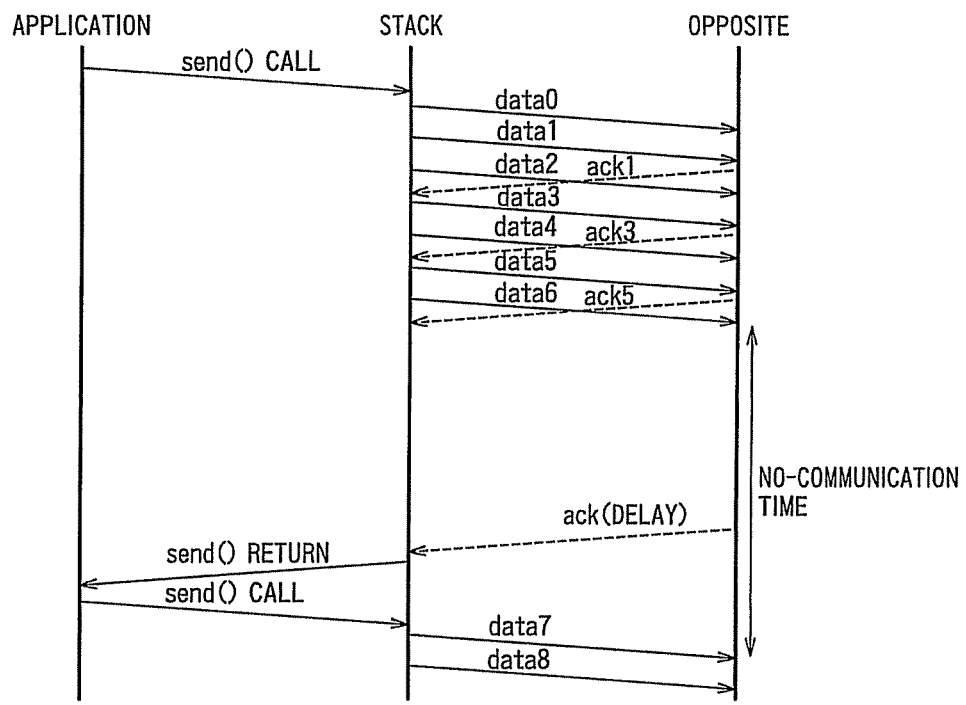
FIG. 4 is a drawing for explaining a delayed acknowledgement.

Specifically, as shown in FIG. 4, in the case in which an application specifies application data which has called a send() function, until the function is returned, a next send() function cannot be called. Therefore, until the function is returned, an instruction to transmit next application data cannot be given. On the other hand, in the side of the protocol stack in which the application data is specified, if the send() function is returned, the application data may be released; therefore, the send() function cannot be returned until transmission of the data is completely finished, in other words, until an acknowledgement of the last data of the application data is returned since the data may be retransmitted (note: in the configuration shown in FIG. 2, a send() function can be returned at the point when the transmission is not finished since copying to the buffer of the stack is carried out to retain the data).

Reasons why the acknowledgement may be delayed include: for example, (A) a case in which a receiving device is carrying out delayed acknowledgement (described later), (B) a case in which the reciprocation delay of a network from/to the receiving device is large, (C) and a case in which the processing speed of the receiving device is slow. In such cases, the timing of returning the send( ) function is delayed, no-communication time is generated as a result, and the transmission rate thereof is wastefully lowered.

An embodiment of the present invention which solves the above described problems is shown in FIG. 1. FIG. 1 shows a basic configuration, and a typical example thereof is realized by a PC, a server, an ASIC, a FPGA (Field Programmable Gate array), etc. The device of FIG. 1 is a data transmitting device, which carries out continuous data transmission while receiving acknowledgements based on sequence numbers of data from an opposed receiving device based on a communication protocol such as a TCP/IP protocol.

The data transmitting device is composed of a data transmission instructing unit 101, a packet transmission instructing unit 102, a data storage unit 103, a data reading unit 104, a header generating unit 105, a packet generating unit 106, a network I/F unit 107, an acknowledgement receiving unit 108, a packet retransmission instructing unit 109, a data copying unit 110, and a transmission completion determining unit 111.

The data transmission instructing unit 101 generates a data transmitting instruction, which instructs transmission of application data.

The packet transmission instructing unit 102 generates a packet transmitting instruction, which causes transmission of packets one packet at a time to be continuously carried out based on the data transmitting instruction.

The data storage unit 103 has a data storage area, which stores the application data to be transmitted, and a temporary buffer area (hereinafter, "temporary buffer").

The data reading unit 104 receives the packet transmitting instruction and reads an amount of application data corresponding to one packet from the data storage area of the data storage unit 103.

The header generating unit 105 receives the packet transmitting instruction and generates a header containing sequence number information of the data contained in a packet to be transmitted.

The packet generating unit 106 generates the packet from the generated header and the read data.

The network I/F unit 107 carries out transmission of the generated packets to a network and reception of packets from the network.

The acknowledgement receiving unit 108 receives an acknowledgement packet containing acknowledgement sequence number information indicating through which data in the sequence data has been received among the data of the transmitted packets.

The packet retransmission instructing unit 109 specifies the data to be retransmitted in accordance with the received acknowledgement sequence number information and gives a packet transmitting instruction of the specified data to the data reading unit 104 and the header generating unit 105.

In the case in which, when the data reading unit 104 reads data, the data is the data that is within a predetermined number of bytes counted from the end of the application data, the data copying unit 110 saves the read data as a copy in the data storage unit 103.

At the point when the data reading unit 104 has read the data up to the end of the application data and when the acknowledgement containing the acknowledgement sequence number information corresponding to the byte within the predetermined number of bytes counted from the end of the application data has been received, the transmission completion determining unit 111 determines transmission completion of the application data and notifies the data transmission instructing unit 101 of the transmission completion. When the transmission completion is determined, the application data to be transmitted next is overwritten to the data storage area of the data storage unit 103.

As an example, a mode which realizes the data transmission instructing unit 101 by application software in a host CPU of the data transmitting device, realizes the data storage unit 103 by an external memory such as SDRAM, and realizes the parts other than those by the hardware different from the host CPU such as a NIC, ASIC, and FPGA is conceivable. However, the present invention is not limited to this mode. For example, "the parts other than those" may be realized by software.

A specific processing flow is as described below. First, the data transmission instructing unit 101 specifies, for example, a top address in a memory and length (for example, address "0x42000000" and length of 1 MB) of the application data desired to be transmitted to output an instruction to the packet transmission instructing unit 102. This is realized, for example, by a send() function of Socket API.

The packet transmission instructing unit 102 sections the specified application data by the data length (for example, the maximum segment size of TCP. 1460 bytes) of one packet from the top of the data. The packet transmission instructing unit 102 specifies the top address and length of the sectioned data, the sequence number of the top data, etc. to continuously output header generating instructions to the header generating unit 105 and output data reading instructions to the data reading unit 104.

For example, in the case in which the sequence number starts from "1", the instruction of a first packet is expressed by: an address "0x42000000", a length of 1460 bytes, and the sequence number "1" of the top data (byte). This means a byte sequence which starts from the sequence number "1" and has a length of 1460 bytes, wherein the data having the sequence numbers of "1" to "1460" is practically indicated. The instruction of a second packet has an address "0x420005b4", a length of 1460 bytes, and a sequence number "1461"; and the instruction of a third packet has an address "0x42000b68", a length of 1460 bytes, and a sequence number "2921". Note that the example in which the sequence numbers are imparted to the bytes, respectively, is shown herein; however, the present invention is not limited to that.

If the application data is 1 MB (=1024×1024 bytes), since 1024×1024/1460=718, remainder 296, each of the packets up to the 718th packet has a length of 1460 bytes as well as the above description, and the last 719th packet has a length of 296 bytes. Therefore, the instruction of the last 719th packet has an address "0x420ffed8", a length of 296 bytes, and a sequence number "1048281".

Based on such an instruction, the header generating unit 105 generates a TCP/IP header including the specified sequence number based on protocol specifications. The data reading unit 104 reads data from the data storage unit 103 only by the length specified by the specified address. The header generating unit 105 passes the generated header to the packet generating unit 106, and the data reading unit 104 passes the read data to the packet generating unit 106, which is in a subsequent stage.

The packet generating unit 106 combines them to generate a packet, further adds, for example, a checksum thereto, and passes that to the network I/F unit 107. The network I/F unit 107 transmits the packet to the receiving device ahead of the network.

When the transmitted packet is received by the receiving device, the receiving device returns an acknowledgement that it has been received based on the protocol specifications. More specifically, the sequence number of the data expected next to the received data is contained in an acknowledgement packet as an acknowledgement sequence number and is returned to the transmitting device.

When the transmitting device receives the acknowledgement packet and checks the acknowledgement sequence number, the fact that the data before the sequence number has reached the receiving device can be confirmed.

If a packet is lost on the network, the receiving device receives packets of discontinuous sequence numbers. In that case, for example, in the case of the TCP/IP protocol specifications, the receiving device returns the sequence number of the data expected next to the sequence number of the last data of continuously received data.

For example, first, a packet having a sequence number "1" and a length of 1460 bytes is received, an acknowledgement sequence number "1461" is returned, a packet having a sequence number "1461" and a length of 1460 bytes is then received, and an acknowledgement sequence number "2921" is returned. Subsequent to that, reception of a packet having a sequence number "2921" is expected. However, for example, the packet is lost on the network, and a packet that is a packet further after that and has a sequence number "4381" and a length of 1460 bytes is received. In this case, the continuously received data is consistently the data up to the sequence number "2920"; therefore, an acknowledgement packet of the acknowledgement sequence number "2921" is returned.

Then, even when the subsequent packets after that reach the receiving device, all of the acknowledgement sequence numbers contained in the acknowledgement packets from the receiving device are "2921"; therefore, the acknowledgement packets of the acknowledgement sequence number "2921" become redundant.

The transmitting device can detect the fact that the packet starting from the sequence number is lost on the network by detecting the redundant acknowledgement sequence number. More specifically, the above described packet retransmission instructing unit 109 specifies the packet of the redundant acknowledgement sequence number as a packet to be retransmitted and outputs a retransmitting instruction of the sequence number "2921".

Specifically, it is output as the address "0x42000b68" (calculated by adding the difference between the sequence number "2921" and the starting sequence number "1" to the top address "0x42000000" of the application data), the length of 1460 bytes, and the sequence number "2921". Then, based on this instruction, the header generating unit 105, the data reading unit 104, the packet generating unit 106, and the network I/F unit 107 transmit the retransmitting packet to the network in a manner similar to the above description.

The method of specifying the retransmitting packet is not limited to the above description. Other examples include a method in which, if no acknowledgement is returned for a certain period of time, the largest acknowledgement sequence number received at the point is specified as the sequence number of the retransmitting packet. These methods of specifying the retransmitting packet are merely examples, and other specifying methods in which the packet is specified based on protocol specifications of, for example, TCP/IP can be also applied to the embodiment of the present invention. These specifying methods per se are not relevant to the embodiment of the present invention and do not limit the embodiment of the present invention.

Moreover, since the acknowledgement receiving unit 108 operates upon packet reception, typically, the operation is carried out asynchronously with respect to the packet transmitting processes carried out by the other functional units. Therefore, the mode in which the information of the acknowledgement sequence number received by the acknowledgement receiving unit 108 is once stored in an unshown memory or the like by the acknowledgement receiving unit 108 at the point when the acknowledgement packet is received can be employed. In this case, all the functional units such as the transmission completion determining unit 111 and the packet retransmission instructing unit 109 that reference the information of the acknowledgement sequence number upon packet transmission read the memory or the like, thereby obtaining the information of the acknowledgement sequence number.

In the above described manner, packet retransmission based on the packet transmission and acknowledgement is carried out while directly reading the application data. At the point when an acknowledgement packet containing the acknowledgement sequence number corresponding to the byte next to the last byte of the application data is finally received, the fact that all the data has been delivered to the peer can be confirmed.

However, as described above, the reception of the acknowledgement packet containing the acknowledgement sequence number corresponding to the byte next to the last byte may be delayed (see FIG. 4). This is due to the above described delayed acknowledgement of (A). The delayed acknowledgement of (A) corresponds to, for example, "Delayed ACK" in TCP/IP. The receiving device is not necessarily required to carry out acknowledgement every time a data packet is received; therefore, in order to reduce communication load and the processing load of the transmitting/receiving devices, an acknowledgement corresponding to two packets is collectively output in some cases every time the data corresponding to two packets is received. Regarding the delayed acknowledgement, there are characteristics that: an acknowledgement is returned without delay in the case in which the last transmission data is two packets and the segment length of the two packets is a largest segment length; however, in the case in which the last transmission data is one packet or in the case in which the segment length of the last packet in the case of two packets is less than the largest segment length, the acknowledgement is delayed due to specifications.

Figure 5:
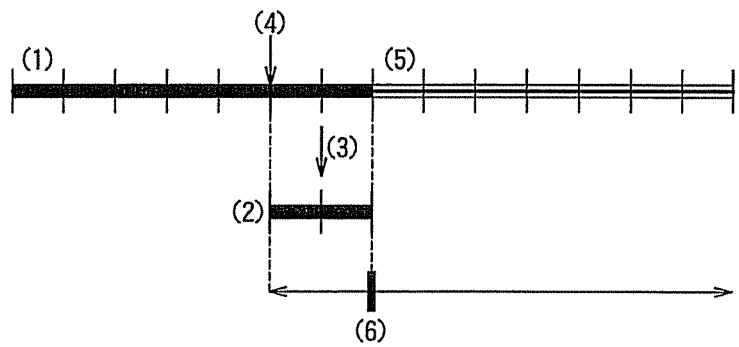
FIG. 5 is a drawing for explaining the operation of the first embodiment.

Therefore, the embodiment of the present invention operates to determine transmission completion without completely waiting for that so that transmission of next application data can be executed. This will be explained in detail by using FIG. 5. FIG. 5 shows a data sequence to be transmitted, wherein it is illustrated in the manner that the sequence number is incremented toward the right.

First, the data transmission instructing unit 101 specifies application data (1) (thick line part). Then, the packet transmission instructing unit 102 divides the data into seven packets as shown in the drawing and sequentially outputs packet transmitting instructions. Based on the transmitting instructions, the data reading unit 104 reads data from the data storage unit (memory) 103 respectively for the packets, the header generating unit 105 generates headers, and the packet generating unit 106 generates packets based on the respective data and headers and transmit the packets via the network IF unit 107.

Herein, if the read data is within a predetermined length (in this case, a data length corresponding to two packets) from the end of the application data, the data reading unit 104 stores the data in an area (temporary buffer) different from the area (data storage area) of the data storage unit 103 in which the application data is temporarily stored for retransmission. More specifically, as shown in FIG. 5, the data copying unit 110 copies (3) the data, which has been read by the data reading unit 104, to the temporary buffer (2) in the area (for example, 0x60000000) different from the area in which the application data is stored.

In parallel with the above described operation, acknowledgement packets from the receiving device are sequentially received. When the acknowledgement numbers contained in the received packets become the values equal to or higher than the sequence number corresponding to the top data of the data previously copied to the temporary buffer, the fact that all of the data (herein, corresponding to the data not copied among the current application data) of the sequence numbers smaller than those of the copied data has been delivered to the receiving side can be confirmed. Therefore, at that point, the transmission completion determining unit 111 determines transmission completion of the application data and notifies the data transmission instructing unit 101 of the transmission completion. For example, in the case in which an instruction for transmission is given by a send( ) function of Socket API, this notification is carried out when the send( ) function is returned.

Then, the data transmission instructing unit 101 specifies next application data (5) (three-line part of FIG. 5), for example, by calling a send( ) function again, and the packet transmission instructing unit 102 similarly divides the data into packets and outputs transmitting instructions. The next application data is written to the data storage area of the data storage unit 103. The data may be written to the same area as the previous application data or may be written to a different area. Herein, in the case in which retransmission is to be carried out according to an acknowledgement from the receiving device; if the data of the sequence number after (6) of the drawing is to be retransmitted, the data reading unit 104 directly reads the data from the next application data (6). If the data of the sequence number before (6) is to be retransmitted, the data reading unit 104 reads the data from the temporary buffer (2) in which the previously copied data is stored.

When operation is carried out in this manner, even when the acknowledgement from the receiving device is delayed, without waiting for that, transmission of the next application data can be carried out without copying all of the data. As a result, continuous data transmission with short no-communication time can be carried out, and speed-up of the data transmission can be realized with low power consumption.

The above example shows the example in which the data having the length corresponding to two packets from the end of the application data is copied to the temporary buffer; however, the length is not limited to this.

As described above, examples of reasons why the acknowledgement may be delayed include: (A) a case in which the receiving device, is carrying out the delayed acknowledgement, (B) a case in which the reciprocation delay of the network to/from the receiving device is large, and (C) a case in which the processing speed of the receiving device is slow.

As described above, the delayed acknowledgement (A) corresponds to, for example, "Delayed ACK" in TCP/IP and is to collectively output an acknowledgement corresponding to two packets every time the data corresponding to two packets is received in order to reduce the communication load and the processing load of the transmitting/receiving devices. In this case, when no packets are lost on the network, the acknowledgements of the packets which are, in terms of time, before the data corresponding to the two packets from the end of the data are always returned without delay in a worst case regardless of the size of the application data. Therefore, if the transmitting device always copies the data corresponding to two packets and operates so as to transmit next application data without waiting the acknowledgement of this part, data transmission can be always carried out without being affected by the delayed acknowledgement.

Figure 6:
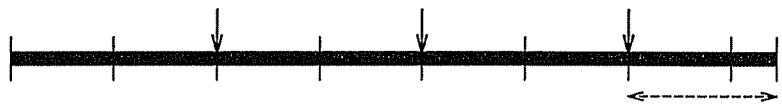

This will be explained below in more detail. FIG. 6 shows application data and the state of acknowledgements (solid arrows) with respect to that. The last packet is normally shorter than a largest segment size in this manner; wherein, in this case, the part to be copied is "largest segment size×1"+ "the part corresponding to the last short packet" (the part corresponding to the length of a dotted arrow).

Figure 7:

The above described case is the case in which the number of packets is an even number. However, in the case in which the number of packets is an odd number as shown in FIG. 7, it is only required to copy only the last one packet in such a case since the acknowledgement of only the last short packet is delayed.

Figure 8:
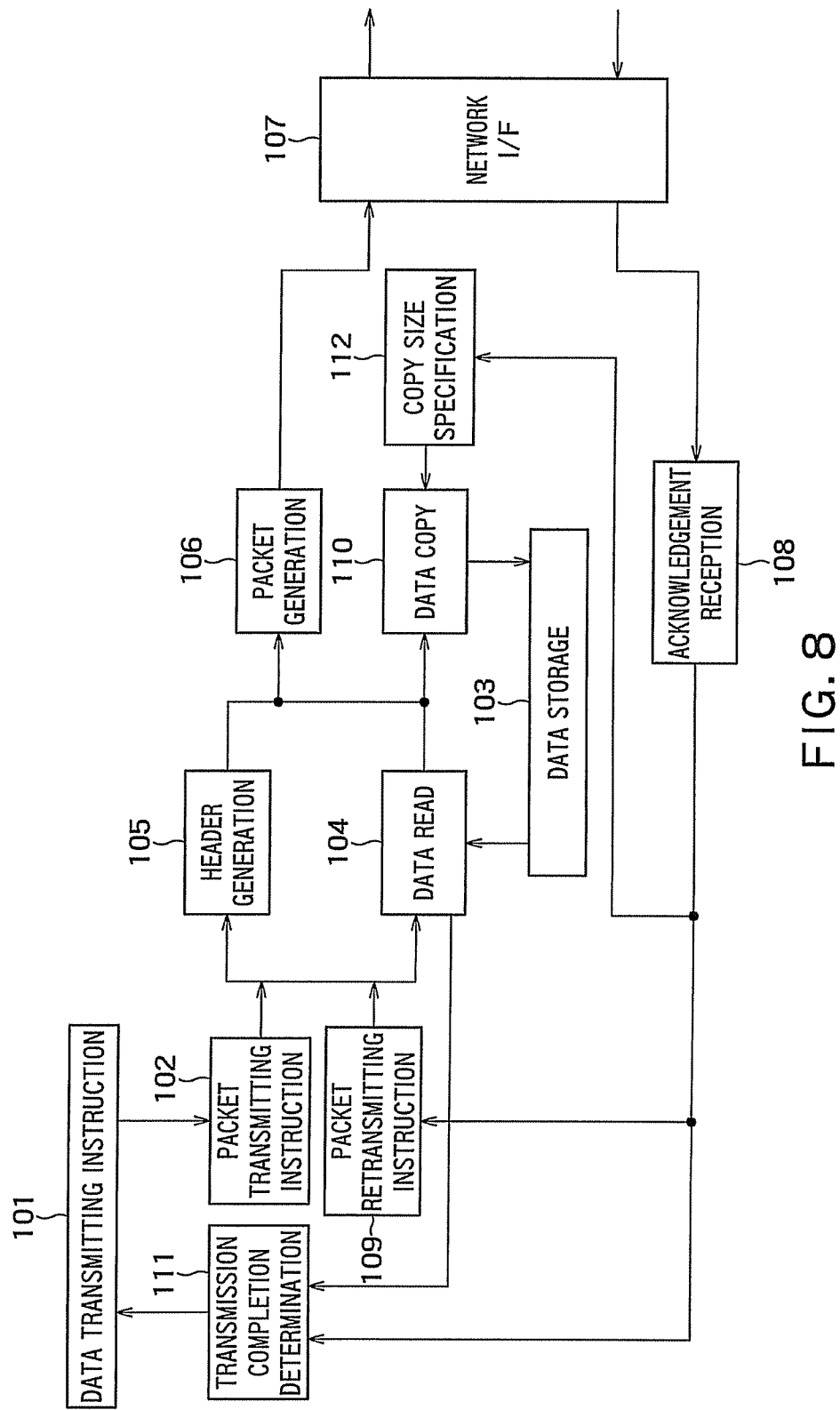
FIG. 8 is a drawing showing a configuration in which a copy size specifying unit is added to the device of FIG. 1.

In this manner, the size to be actually copied is sometimes the last two packets or sometimes the last one packet depending on the even/odd number of packets. However, when the last two packets are copied simply for a worst case, the influence of the delay can be always avoided. More optimally, it is desirable that operation be carried out so as to predict which one of the above described cases will take place and copy the part corresponding to one packet if one packet is enough. A configuration provided with a copy size specifying unit 112, which specifies the data size to be copied based on such determination, is shown in FIG. 8. The elements having the same names as those of FIG. 1 are denoted by the same reference numerals, and redundant explanations will be omitted except for extended processes. The copy size specifying unit 112 determines whether the number of packets is an even number or odd number, determines to copy the last two packets in the case of the even number or only the last one packet in the case of the odd number, and gives a notification to the data copying unit 110. Alternatively, the copy size specifying unit specifies a data length corresponding to the last two packets in the case of the even number or a data length of the last one packet in the case of the odd number and notifies the data copying unit 110 of the specified data length. The data copying unit 110 carries out copy in accordance with the notified information.

The above description is a mode corresponding to the case of the above described reason (A) that delays the acknowledgement. The following mode can be employed for (B) the case in which the reciprocation delay of the network to/from the receiving device is large and (C) the case in which the processing speed of the receiving device is slow. In the transmitting device, the time elapsed from the time at which the data corresponding to the acknowledgement of a promptly-returned even-numbered packet is transmitted, in other words, delay time of the acknowledgement and a current data transmitting bit rate are measured. Then, the size obtained by further adding a data size corresponding to the product of the delay time and the data transmitting bit rate to the above described size corresponding to one packet or two packets is copied. The data size corresponding to the product may be the value of the product per se or, if "the largest segment size length multiplied by two" is equal to or larger than the value of the product, may be "the largest segment length multiplied by two". If "the largest segment length multiplied by two" is less than the product, the data size may be the largest value of the multiples of "the largest segment length multiplied by two" which is less than the value of the product or may be the smallest value of the multiples of "the largest segment length multiplied by two" which is equal to or larger than the value of the product. In the transmission completion determination, transmission completion can be determined without waiting for the acknowledgement of the additionally copied data.

Figure 9:
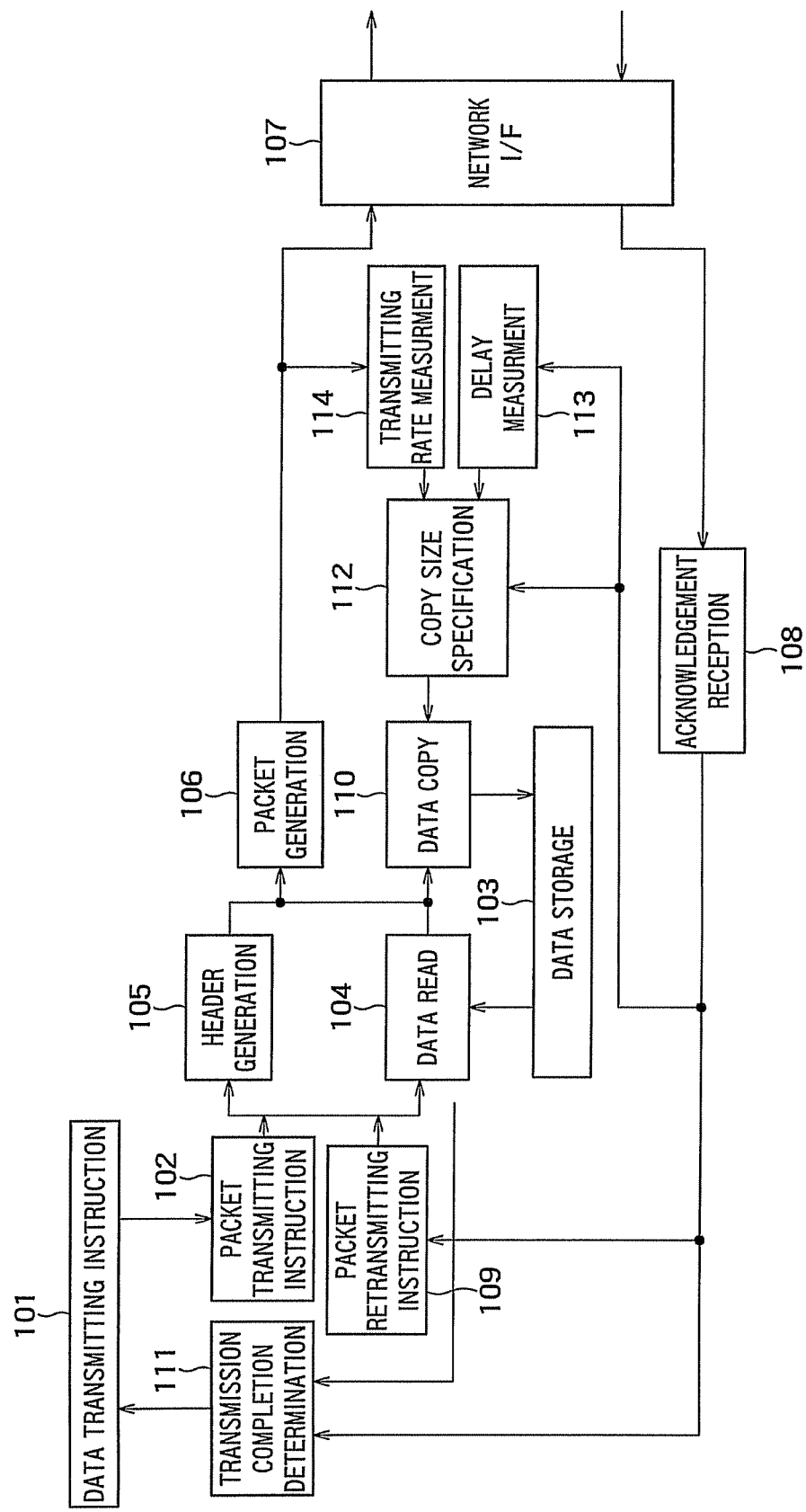
FIG. 9 is a drawing showing a configuration in which a transmitting rate measuring unit and a delay measuring unit are added to the device of FIG. 8.

FIG. 9 shows a configuration provided with a delay measuring unit 113, which measures the delay time of the acknowledgements, and a transmitting rate measuring unit 114, which measures the transmitting bit rate. The elements having the same names as those of FIG. 8 are denoted by the same reference numerals, and redundant explanations will be omitted except for extended processes. Regarding the promptly-returned even-numbered packet, the delay measuring unit 113 measures the delay time from the point when the packet generating unit passes a packet to the network I/F unit until reception of the acknowledgement thereof. The transmitting rate measuring unit 114 observes the transmission of the packets generated by the packet generating unit 106 so as to measure the transmitting data length per unit time in the data transmission, thereby obtaining the transmitting bit rate. The copy size specifying unit 112 specifies the size of additional copy based on the delay time and the transmitting bit rate and carries out copy by the value obtained by adding the specified size to the above described data size (for example, corresponding to two packets). The transmission completion determining unit 111 determines transmission completion at the point when the packets of all the data have been transmitted and the acknowledgement indicating the number equal to or larger than the sequence number of the top byte of the copied data. According to such a mode, even when the delay of (B) and (C) is added, continuous data transmission can be realized without being affected by that.

Next, processes of the case in which the data transmission is further advanced will be described. In the above described examples, the processes in which, subsequent to transmission of certain application data, transmission of the application data next to that is executed have been explained.

When the transmission of the "next application data" is advanced and approaches the end thereof, data copy to the temporary buffer is eventually carried out as well as the transmission of the first application data. However, if the acknowledgement (in other words, the acknowledgement of the sequence number (6) in FIG. 5) with respect to the last data of the first application data (=the last data in the temporary buffer copied from the first application data) has not been returned at this point, there is still a possibility that the data of the temporary buffer will be retransmitted; therefore, the data in the temporary buffer has to remain.

Therefore, if the copy of the next application data to the temporary buffer is executed in this state, the data in the temporary buffer is overwritten by the next application data; as a result, if retransmission of the first application data is carried out thereafter, the problem that the data different from the original data is retransmitted occurs. A mode that avoids this problem is shown in FIG. 10.

Figure 10:
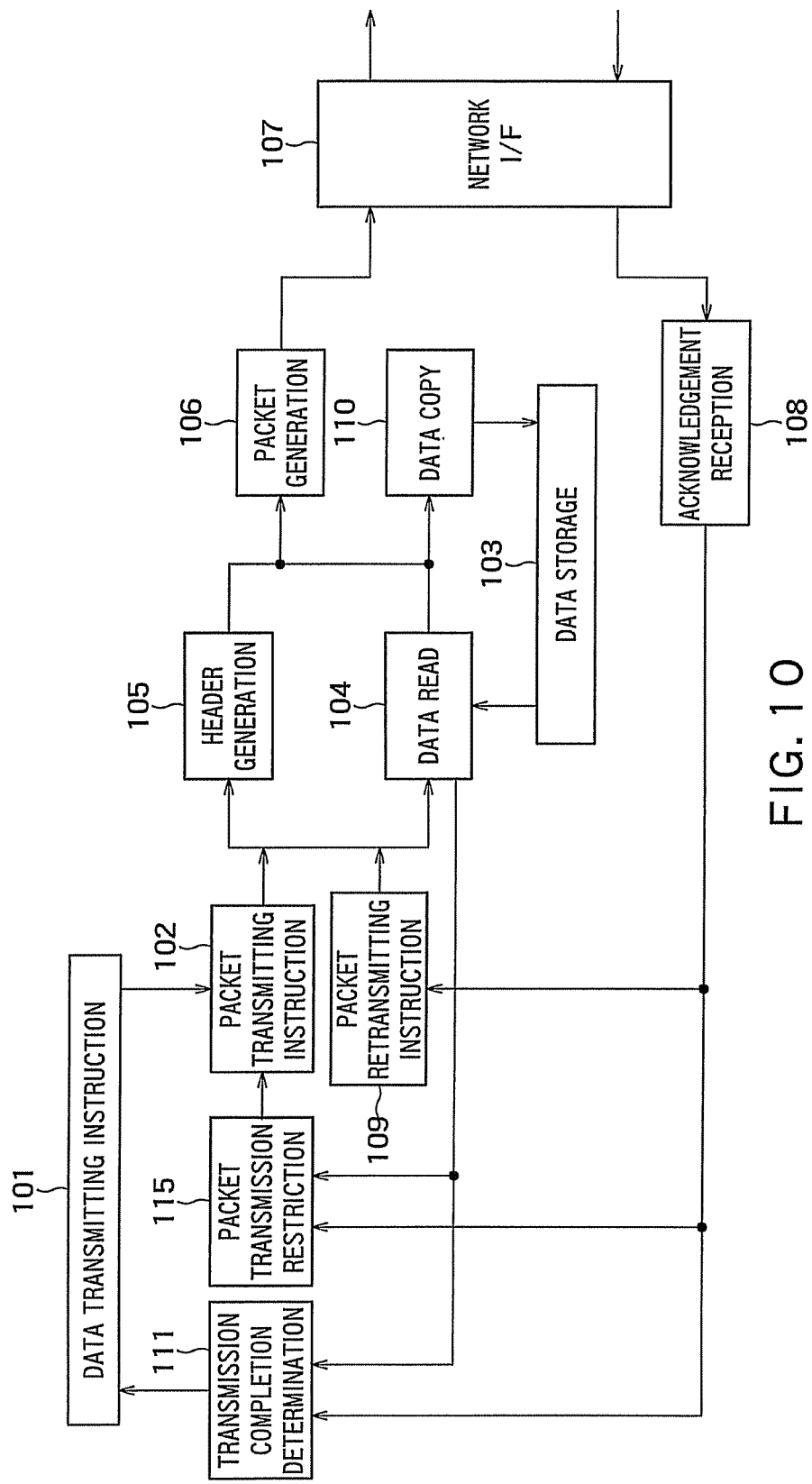
FIG. 10 is a drawing showing a configuration in which a packet transmission restricting unit is added to the device of FIG. 1.

FIG. 10 is provided with a packet transmission restricting unit 115, which temporarily stops the packet transmitting instruction of the packet transmission instructing unit 102, in addition to FIG. 1. The elements having the same names as those of FIG. 1 are denoted by the same reference numerals, and redundant explanations will be omitted except for extended processes.

Figure 11:
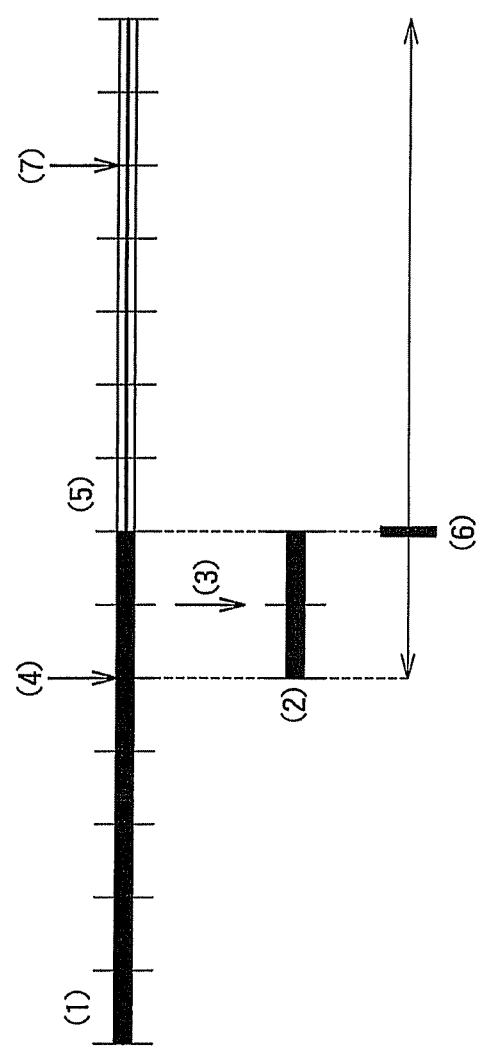
FIG. 11 is a drawing for explaining operation of the packet transmission instructing unit.

In FIG. 11, (1) to (6) are the same as those of FIG. 5, and (7) indicating the point at which copy of the application data (5) to the temporary buffer starts is added thereto.

It is assumed that the transmission of the next application data reaches (7) as described above. At this point, the packet transmission restricting unit 115 causes the packet transmission instructing unit 102 to temporarily stop packet transmission while the acknowledgement of the last data (6) of the previous application data has not been returned. If the acknowledgement is returned, the packet transmission is resumed. When operation is carried out in this manner, the immediately preceding application remaining in the temporary buffer is prevented from being overwritten by the current application data; therefore, the above described problem can be avoided.

More optimally, below described operation may be carried out. In the case in which the acknowledgement which is before the data (6) by one packet has been returned even when the acknowledgement of the data (6) has not been returned, the delivery of the data of the first packet among the two packets in the temporary buffer is confirmed; therefore, retransmission is not required, which means the data may be released. Therefore, in this case, operation may be carried out so as to carry out transmission of the packet of (7), copy the data of the packet to the first-packet area of the temporary buffer, and, when it reaches the transmission of the packet after (7), stop the packet transmitting instruction.

Figure 12:
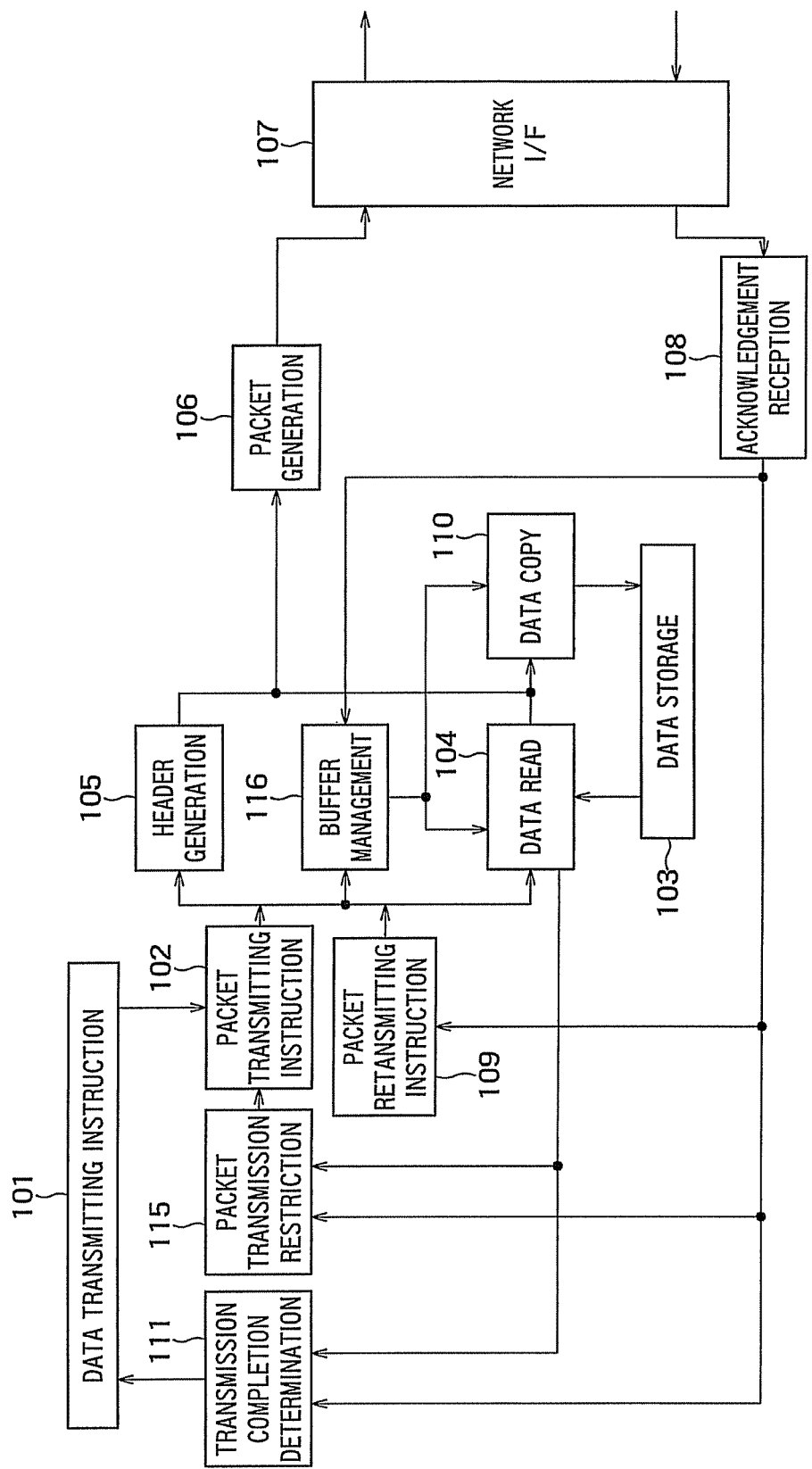
FIG. 12 is a drawing showing a configuration in which a buffer managing unit is added to the device of FIG. 10.

However, the transmission restriction as described above somewhat lowers performance in some cases. This is notable, for example, in the case in which the application data is smaller than the copy size to the temporary buffer. The reason therefore is that, since all of the application data is copied to the temporary buffer in this case, transmission of data cannot be carried out at all if the acknowledgement of the last data of the immediately preceding application data has not been returned at this point. In order to prevent reduction in the performance even in such a case, it is desirable to carry out more complex management of the temporary buffer. A mode of that case is shown in FIG. 12. In FIG. 12, a buffer managing unit, which carries out management of the temporary buffer is provided in addition to FIG. 10. The elements having the same names as those of FIG. 10 are denoted by the same reference numerals, and redundant explanations will be omitted except for extended processes.

As an example of the operation of the buffer managing unit 116, a mode in which a plurality of temporary buffers and address information thereof are managed is conceivable. For example, if eight temporary buffers, temporary buffers 1 to 8, are provided, transmission of eight pieces of application data is enabled even at the point when no acknowledgement has been returned by using them in the manner so that: the copy of the first application data uses the temporary buffer 1, the copy of the next application data uses the temporary buffer 2, the copy of the next application data uses the temporary buffer 3, and so on. Moreover, they can be sequentially reused; for example, when the acknowledgement of the last data of the first application data is returned, the first temporary buffer is released and used for the copy of ninth application data.

In principle, the number of the temporary buffers is finite. Therefore, the operation of restricting the packet transmission at the point when they are exhausted is necessary. When such management of the plurality of temporary buffers is carried out, transmission of a plurality of pieces of application data can be carried out without waiting for the acknowledgement, and the above described reduction in performance can be reduced as a result.

As another example, a mode in which copied data is combined is conceivable. The case in which reduction in the performance becomes notable when the application data is smaller than the size of the copy to the temporary buffer has been explained. For example, in this case, copy of the first application data is carried out from the top, and the copy of the next application data is subsequently carried out with respect to the same temporary buffer.

For example, the copy of first application data takes up 1000 bytes, and next application data is 3 bytes; in this case, the copy of the 3 bytes is carried out with respect to 1001st to 1003rd bytes of the same temporary buffer. Furthermore, if further next application data is 15 bytes, copy thereof is also carried out with respect to 1004th to 1018th bytes of the same temporary buffer. When retransmission of a packet in which the sequence number of the first data of the copy of the first application data is at the top is to be carried out, simply, all of these 1018 bytes are read, and a packet combining them is transmitted.

There is a possibility that the part actually lost over the network is only the first 1000 bytes and that the 18 bytes subsequent thereto has already reached the receiving device; however, in that case, the 18 bytes are simply discarded by the receiving device, and no particular problem is caused.

As described above, transmission of a plurality of pieces of application data can be carried out also by such operation without waiting for the acknowledgement, and the above described reduction in the performance can be reduced as a result. Note that, the information indicating the beginning and the end of the block of each packet (for example, in this case, information of 1000 bytes, 3 bytes, and 15 bytes) may be separately retained, and the packet of only the 1000 bytes may be retransmitted based on the information in the previously explained retransmission.

(Second Embodiment) (Configuration Upon FIN Reception)

According to one aspect of the present embodiment, there is provided a data communicating device to carry out data communication using a protocol that carries out retransmission of data from a transmitting side when loss of the data is detected.

The data communicating device includes a data processing unit, a control processing unit, an information storage unit, a data termination detecting unit, a reception completion determining unit.

The data processing unit carries out transmission and reception to/from a transmitting device via a network, receive a string of data one piece at a time in the reception, and processes received data.

The control processing unit manages a session state of data communication with the transmitting device.

The information storage unit stores the session state.

The data termination detecting unit detects reception of termination data at an end of the string of data.

The reception completion determining unit determines whether all reception of the string of data has been completed or not when the reception of the termination data is detected.

The data processing unit processes the data from the transmitting device in accordance with the session state stored in the information storage unit.

The control processing unit causes the session state to undergo a transition to a finished state when it is determined by the reception completion determining unit that all reception of the string of data has been completed.

The control processing unit, when it is determined that the reception has not been completed, waits to cause the session state to undergo the transition until completion is determined.

The embodiment will be described below with reference to drawings.

The protocol processing of, for example, TCP/IP widely used by, for example, the Internet has been conventionally realized mainly by the software which operates in a CPU. However, along with increase in the speed of recent networks, the TCP/IP processing load of CPUs has been increased, and a device realizing high-speed communication by using TOE (TCP/IP Offload Engine) that carries out TCP/IP processing by dedicated hardware has been proposed.

Conventional data communicating devices include a device which is provided with a communication adapter for low-speed processing and a communication adapter for high-speed processing, executes only packet processing for connecting or disconnecting a TCP session having a complex algorithm by the communication adapter for low-speed processing, and executes only the packet processing for transmitting payload containing, for example, video data by the high-speed adapter. However, this device has a problem when a segment in which "FIN" is set at a control flag for disconnecting a session (hereinafter, "FIN segment") is received in the case in which loss or the like has occurred on a network, wherein retransmission of data is caused. When the "FIN" segment is received, a session state undergoes a transition to "CLOSE-WAIT" in the low-speed adapter; however, if this state transition is made while retransmission of data is caused in the above described manner, there is a problem that retransmitted data cannot be received by the communication adapter for high-speed processing.

Hereinafter, a second embodiment which solves such a problem will be explained in detail.

Figure 13:
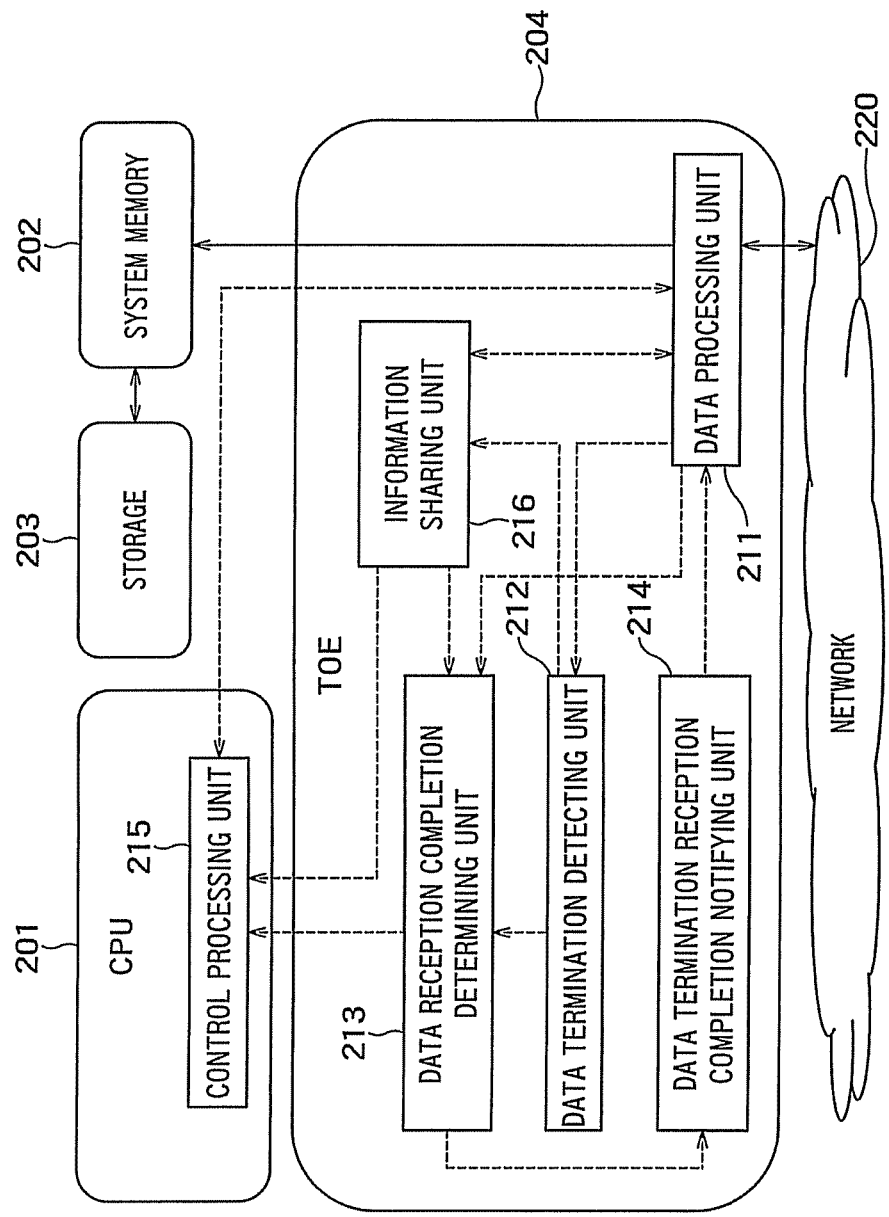
FIG. 13 is a drawing schematically showing a configuration of a data communicating device according to a second embodiment.

FIG. 13 is a block diagram showing a data communicating device according to the second embodiment of the present invention.

The data communicating device according to the second embodiment is a contents accumulating server, which receives contents from clients via a network by TCP, saves the contents in a storage, and, reversely, transmits the contents stored in the storage to the clients via the network.

This server is composed of a CPU 201, a system memory 202, a storage 203, and a TOE 204, and these are connected by buses such as local buses and PCI express.

The CPU 201 is provided with a control processing unit 215. The TOE 204 is provided with a data processing unit 211, a data termination detecting unit 212, a data reception completion determining unit 213, a data termination reception completion notifying unit 214, and an information sharing unit 216.

The data processing unit 211 carries out processing for transmitting/receiving data via a network 220. Specifically, the data processing unit 211 receives a string of data one piece at a time from a peer device via the network.

The data end detecting unit 212 detects data end information (FIN flag) contained in received data. The data termination information corresponds to an instruction to finish data communication. The termination data at the end of the string of data contains the data termination information.

When the data termination information is detected, the data reception completion determining unit 213 determines whether reception of all the data of the string of data has been completed or not.

When it is determined that the reception of all the data to the data termination has been completed, the data termination reception completion notifying unit 214 instructs the data processing unit 211 to notify a communication peer device of the completion of the reception of all the data.

The control processing unit 215 controls the state (session state) of its own terminal in data communication.

The information sharing unit 216 retains session information shared with the control processing unit 215 and the data processing unit 211. The session information contains the session state controlled by the control processing unit 215.

The data processing unit 211 carries out data communication based on the session information retained by the information sharing unit 216. For example, the data processing unit 211 receives data from the peer device while the session state is "ESTABLISHED", but does not receive data while the state is "CLOSE-WAIT 1".

Figure 19:
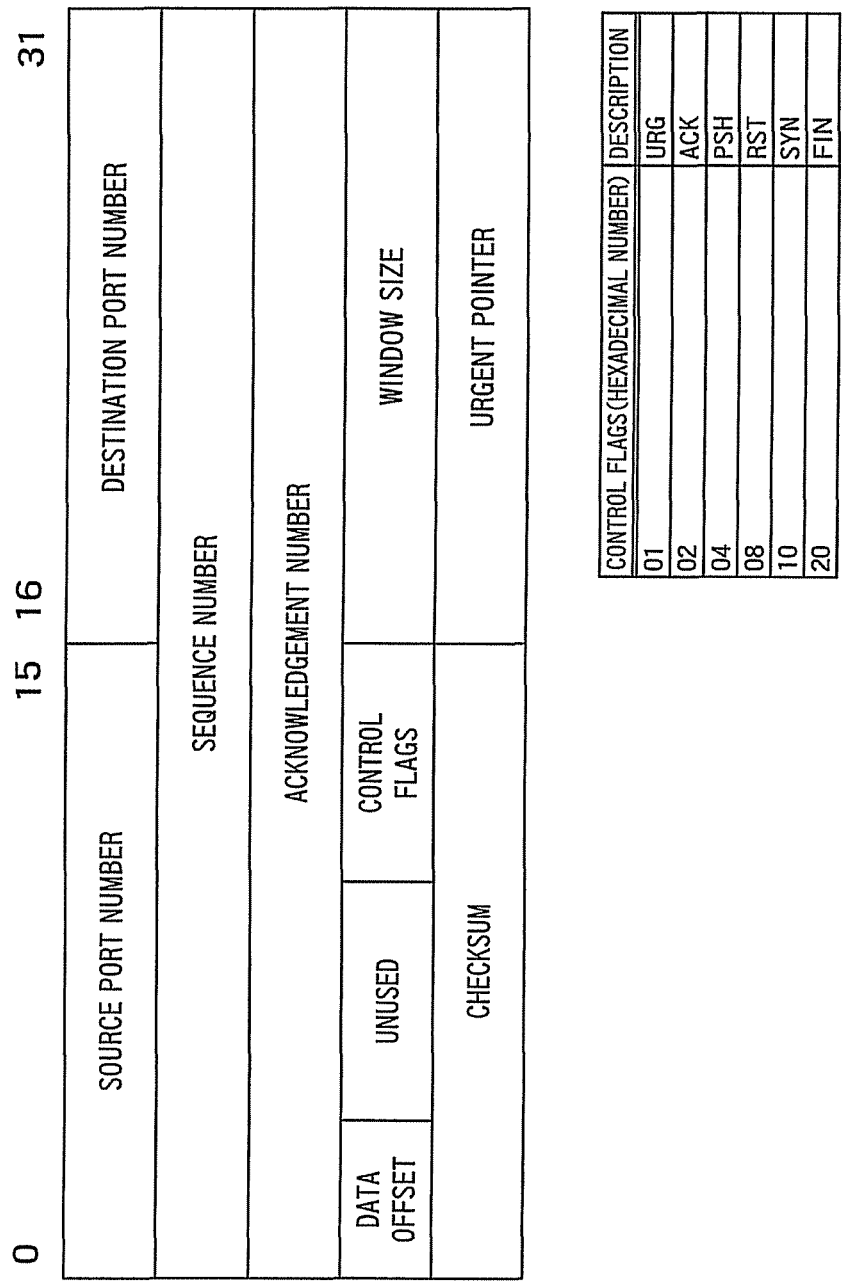
FIG. 19 is a drawing showing a header structure of TCP.

The present device carries out communication by using TCP defined by RFC 793. FIG. 19 shows a header structure of TCP.

An example of accumulating contents from a client into the storage via the network by using the present device will be explained.

First, in the present device, for example after initializing processes of the units, preparation for establishing a session of TCP is carried out by the control processing unit 215 of the CPU 201. A list of session states of TCP is shown in the table of FIG. 20. The present device operates as a server; therefore, session information of TCP is generated by a port number determined in advance such as the number 50000, and the state thereof is set to "LISTEN". Note that "LOCAL USER" in the drawing means, for example, an application operated by the CPU of the present device. Examples of the session information are shown in the table of FIG. 21. The session information is retained for each session in the information sharing unit 216. Note that the session information may speed up search of a matching session by generating a hash list by using IP addresses and port numbers.

In the thus-prepared state, connection of TCP is requested by another communicating device (hereinafter, referred to as "peer device"). In TCP, connection is established by a procedure called "three-way handshake". A TCP segment (hereinafter, called "SYN segment"), in which: for example, an unused port number allocated by OS is set as a source port number; the waiting port number 50000 of the present device is set as a destination port number; a sequence number, data offset, window size, checksum, and urgent pointer are appropriately set; and only SYN is set among control flags is transmitted from the peer device.

First, the present device, which has received this via the network, carries out receiving processes of lower layer protocols of TCP by the data processing unit 211. Herein, the lower layer protocols are, for example, Ethernet® as the physical layer and the data link layer and IPv4 (Internet Protocol version 4) as the network layer. After the processes of the lower layer protocols are carried out, a receiving process of TCP is carried out.

In the receiving process of TCP, first, whether the checksum of TCP is correct or not is determined, thereby confirming that the segment is not broken. After it is confirmed that the segment is not broken, search of the session information is carried out.

In the present device, the CPU 201 and the TOE 204 cooperate to carry out processing of TCP/IP; therefore, the session information is shared by the information sharing unit 216. The information sharing unit 216 may be realized by a SRAM (Static Random Access Memory) in the TOE 204 or may be realized in the system memory.

The data processing unit 211 confirms a control flag field of the received segment. Moreover, the data processing unit 211 checks whether a session matching a source IP address, destination IP address, source port, and destination port of the received TCP segment is present in the information sharing unit 216 or not and confirms the session state thereof.

If the session matching the received segment is present and data contained in the segment is within the range of the received window, the data processing unit 211 writes the data to the system memory 202, saves the data in the storage 203, carries out a session information updating process of, for example, "RCV_NXT" or "RCV_WND", and transmits a segment (ACK segment), in which "ACK" is set among control flags, to the peer device.

However, if "RCV_SHUT" of the session information is set, the data processing unit 211 does not carry out processing of the data even when the data is contained in the segment. Furthermore, if any of below conditions is satisfied, the data processing unit 211 passes a frame to the control processing unit 215 and carries out processing by the control processing unit 215.

The state of the session is "SYN-RECEIVED" (hereinafter, "SYN-RECV).
"RCV_SHUT" of the session information is set.
The received segment is "ACK" with respect to the transmitted "FIN" segment.
Any of "RST", "SYN", and "FIN" is set among control flags of the received segment.

"RCV_SHUT" prohibits reception of a segment thereafter. Whether only transmission is to be prohibited, only reception is to be prohibited, or both transmission and reception are to be prohibited can be specified as an option when the session is to be disconnected by the control processing unit 215. When the reception is prohibited in this case, "RCV_SHUT" is set.

The control processing unit 215 is provided with a function of carrying out processing of TCP which did not match the session information. When the "SYN" segment from the client is received, the control processing unit searches for a session that has a "LISTEN" state as the session state and matches the source IP address, the destination IP address, and the destination port from the session information of the information sharing unit 216.

If there is no match, the data processing unit 211 is instructed to transmit a TCP segment in which "RST" is set among control flags.

On the other hand, if there is a matching session, the session state is changed to "SYN-RECV", and information such as an initialized sequence number, an acknowledgement number incremented by 1, and the window size is saved as the session information.

Then, the data processing unit 211 is instructed to transmit a TCP segment (hereinafter, called "SYN-ACK") in which SYN and ACK are set among control flags.

When the "SYN-ACK" segment is received, the client transmits an "ACK" segment with respect to that.

The data processing unit 211, which has received this, carries out processes of the lower layer protocols, then calculates the checksum of TCP, and, if the segment is not broken carries out search of a session. The matching session information is found by the search, and the session state thereof is "SYN-RECV"; therefore, a frame is passed to the control processing unit 215 of the CPU. The control processing unit 215 recognizes that it is the "ACK" segment with respect to "SYN" and changes the session state to the "ESTABLISHED" state.

Note that a specific state control processing unit (not shown), which increments the acknowledgement number in the TOE 204 side by one and changes the session state to the "ESTABLISHED" state only when the "ACK" segment with respect to the "SYN" segment is received in the "SYN-RECEIVED" state or "SYN-SENT" state to change the state to the "ESTABLISHED" state, may be provided. When the specific state control processing unit is provided, communication can be carried out without missing any data segment even in the case in which the operating speed of the CPU is not sufficient.

When the state becomes the "ESTABLISHED" state, transmission of data from the client is carried out. In the transfer of the data, a TCP segment containing the data is transmitted. In the present device, which has received it, the data processing unit 211 carries out the lower layer protocols and checksum calculations of TCP and searches for a session from the information sharing unit 216. In this case, if a matching session is found and the data contained in the segment is within the range of the received window, session information such as "RCV_NXT" or "RCV_WND" of the information sharing unit 216 is updated, and the data is written to the system memory and saved in the storage 203. Furthermore, an "ACK" segment with respect to the received data is generated and transmitted to the client via the network.

Figure 14:
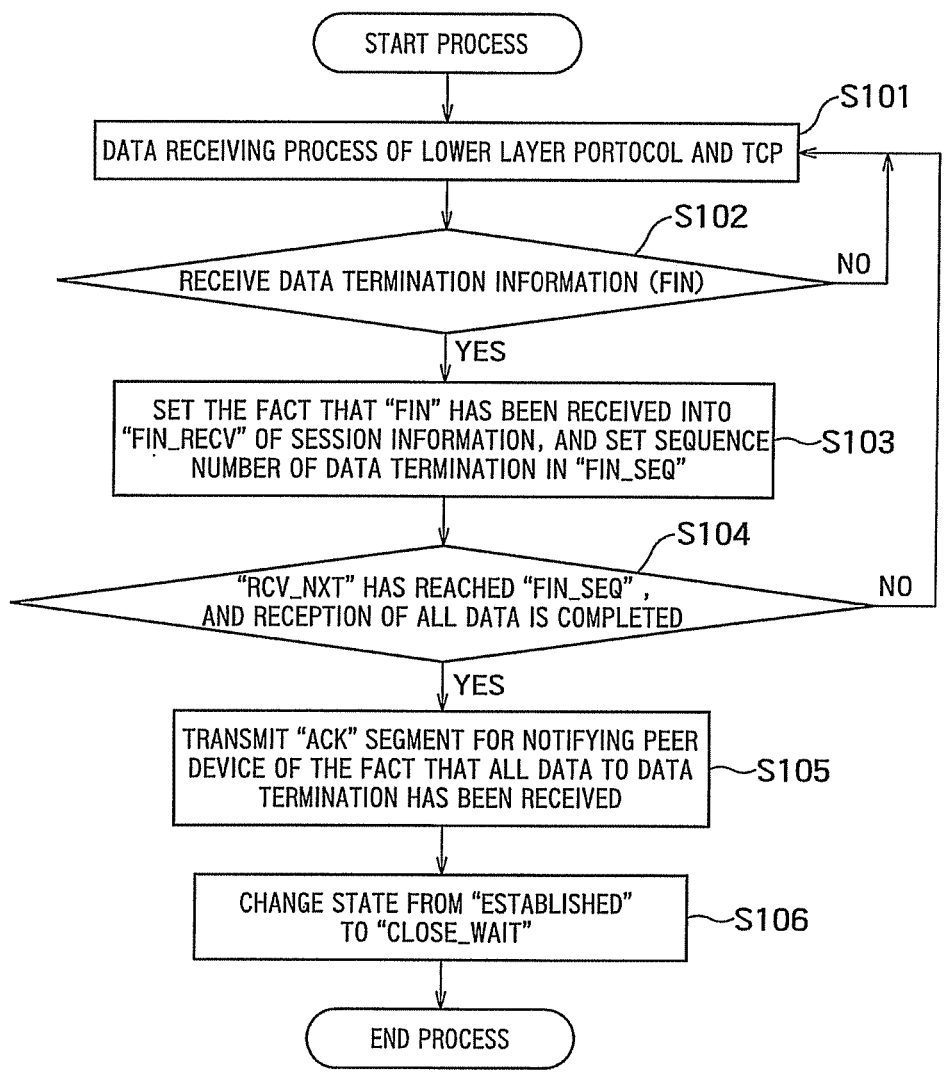
FIG. 14 is a flow chart for explaining operation of the device of FIG. 13.

FIG. 14 is a flow chart showing operation of the data communicating device according to the second embodiment of the present invention.

In the client, when all of the data to be transmitted has been transmitted, a segment in which "FIN" is set among control flags is generated and transmitted for disconnecting the session.

The data processing unit 211 receives the segment from the client, carries out protocol processing of the lower layers, then calculates the checksum of TCP, and searches for a matching session from the information sharing unit 216 (S101). In this case, a session having the state of "ESTABLISHED" is found. Subsequently, whether the sequence number thereof is within the range of the received window or not is confirmed, and the acknowledgement number thereof is confirmed. If the data is within the received window, values such as "RCV_NXT" and "RCV_WND" in the session information of the information sharing unit 216 are updated, the data is written to the system memory 202, and the data is saved in the storage 203. Moreover, an "ACK" segment is transmitted to the peer device.

Whether the reception of a segment in which "FIN" is set among the control flags is detected or not is determined by the data termination detecting unit 212 (S102). If not detected (NO in S102), the process returns to step S101.

If reception of the segment in which "FIN" is set is detected (YES in S102), the fact that "FIN" has been received is set in the entry of "FIN_RECV" of the session information of the information sharing unit 216 (S103). Moreover, the sequence number of the last data contained in the "FIN" segment is stored in "FIN_SEQ" (S103).

The data reception completion determining unit 213 reads "RCV_NXT" and "FIN_SEQ" of the session information from the information sharing unit 216 and determines whether "RCV_NXT" has reached "FIN_SEQ" or not (S104). If "RCV_NXT" has not yet reached "FIN_SEQ" at this point (NO in S104), every time a new segment is received, a notification is given from the data processing unit 211 to the data reception completion determining unit 213, and determination of the data reception completion is carried out.

If the data termination is detected and the data reception is completed (YES in S104), a notification is given to the control processing unit 215, and the data termination reception completion notifying unit 214 instructs the data processing unit 211 to transmit an "ACK" segment with respect to the "FIN" segment (S105). Moreover, the control processing unit 215 causes the state to undergo a transition from "ESTABLISHED" to "CLOSE-WAIT" (S106). Note that the acknowledgement number in this process treats "FIN" as data corresponding to 1 byte, and the value "FIN_SEQ+1" is transmitted as the acknowledgement number.

When the above described "ACK" segment is received by the client, the session disconnection in the client side is completed, and a half-closed state is obtained. In the server, the completion is detected, a "FIN" segment is transmitted, and, when an "ACK" segment with respect to "FIN" is returned from the client, the disconnection of the session in the server is completed.

Figure 15:
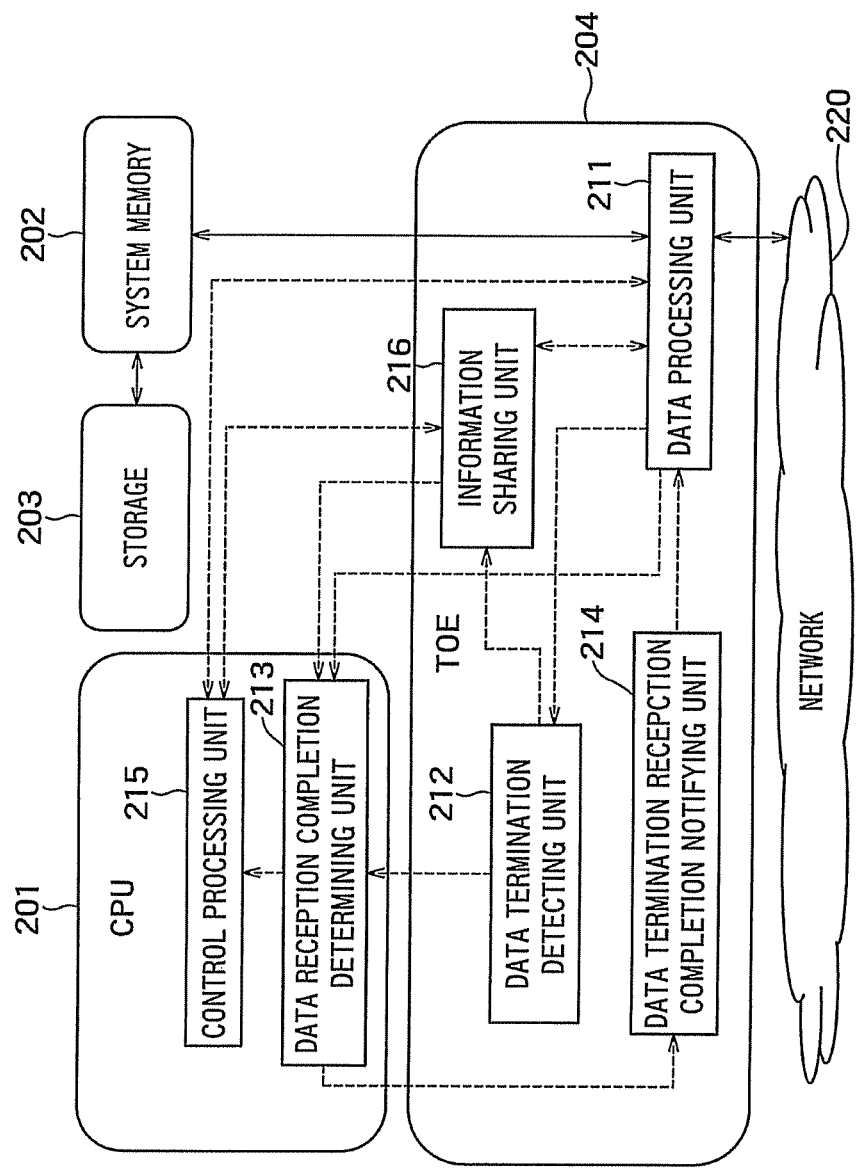
FIG. 15 is a drawing showing a modification example of the device of FIG. 13.

Note that, in the above description, the case in which the data reception completion determining unit 213 is provided in the TOE 204 has been explained. However, a configuration in which the data reception completion determining unit 213 is provided in the CPU 205 as shown in FIG. 15 may be employed. In this case, the data reception completion determining unit 213 is notified of the fact that a segment has newly arrived by an interrupt from the data processing unit 211. Every time this occurs, the data reception completion determining unit 213 reads "RCV_NXT" and "FIN_SEQ" of the session information from the information sharing unit 216 and, if "RCV_NXT" has reached "FIN_SEQ", gives a notification to the control processing unit 215; and the control processing unit 215 carries out the transition of the state.

Also, a configuration in which the notification by interrupt is not carried out from the data processing unit 211 to the data reception completion determining unit 213 may be employed. In this case, the data reception completion determining unit 213 compares the values of "RCV_NXT" and "FIN_SEQ" of the session information of the information sharing unit 216 at a certain interval such as 10 ms; and when "RCV_NXT" reaches "FIN_SEQ", a notification can be given to the control processing unit 215.

Moreover, in the above description, a unit that passes the frame from the data processing unit 211 to the control processing unit 215 may be realized by using an interrupt, a register, and a shared memory. For example, a ring buffer composed of an entry indicating a pointer of the stored location of the frame is generated, the control processing unit 215 and the data processing unit 211 are configured to notify each other of the index number of which processing has been completed via a register of the TOE 204, and occurrence of an event is notified by an interrupt.

Note that when the peer device is configured to transmit the "FIN" segment after reception of the "ACK" segment with respect to all segments other than the "FIN" segment is confirmed, the determination whether all the segments have been received or not is not required to be carried out after the present device receives the "FIN" segment, and development cost can be reduced.

In this manner, by using the data communicating device according to the second embodiment, in the case in which loss or the like occurs on a network, wherein retransmission of data is caused, retransmitted data can be received without missing any piece thereof since the state transition of the session ("ESTABLISHED" to "CLOSE-WAIT 1") is carried out after reception of all data is completed even when the "FIN" segment is received.

(Third Embodiment) (Configuration Upon Fin Transmission)

According to an aspect of the present embodiment, there is provided a data communicating device to carry out data communication with a peer device by using a protocol that carries out flow control.

The data communicating device includes a control processing unit, an information storage unit, a data processing unit, a determining unit, a data termination setting unit and the data processing unit.

The control processing unit controls a session state of the data communication.

The information storage unit stores the session state and flow control information used in the flow control.

The data processing unit carries out the data communication with the peer device via a network based on the flow control information and the session state and updates the flow control information in accordance with the data communication.

The determining unit determines whether it is possible to transmit data termination notification data that notifies termination of the data communication to the peer device based on the flow control information in the information storage unit.

The data termination setting unit instructs the data processing unit to transmit the termination notification data when it is determined possible by the determining unit.

The data processing unit transmits the termination notification data to the peer device.

When it is determined impossible by the determining unit, the data termination setting unit waits to send a transmitting instruction of the termination notification data until it is determined to be possible.

The embodiment will be described below with reference to drawings.

The protocol processing of, for example, TCP/IP widely used by, for example, the Internet has been conventionally realized mainly by the software which operates in a CPU. However, along with increase in the speed of recent networks, the TCP/IP processing load of CPUs has been increased, and a device realizing high-speed communication by using TOE (TCP/IP Offload Engine) that carries out TCP/IP processing by dedicated hardware has been proposed.

Conventional data communicating devices include a device which is provided with a communication adapter for low-speed processing and a communication adapter for high-speed processing, executes only packet processing for connecting or disconnecting a TCP session having a complex algorithm by the communication adapter for low-speed processing, and executes only the packet processing for transmitting payload containing, for example, video data by the high-speed adapter.

However, in the transmission of a "FIN" segment, the communication adapter for low-speed processing and the communication adapter for high-speed processing operate asynchronously. Therefore, a problem may be generated upon transmission of the "FIN" segment.

The "FIN" segment is treated as one-byte data. However, in the case in which the window size of a receiving side is determined to be equal to or larger than one byte and the communication adapter for low-speed processing transmits the "FIN" segment, the segment infringing flow control is transmitted when the window size is actually zero.

In the case in which an "ACK" segment with respect to a "FIN" segment is to be transmitted, if data is kept being transmitted from the communication adapter for high-speed processing in a receiving side, the communication adapter for low-speed processing becomes incapable of calculating a correct acknowledgement number.

Furthermore, when a "FIG" segment is to be transmitted in the state in which the communication adapter for high-speed processing in a transmitting side keeps transmitting data to the receiving side independently from the low-speed adapter, wherein the data is generated by hardware different from the low-speed adapter, the sequence number to be imparted to the "FIN" segment cannot be correctly calculated.

Hereinafter, a third embodiment which solves these problems will be explained in detail.

Figure 16:
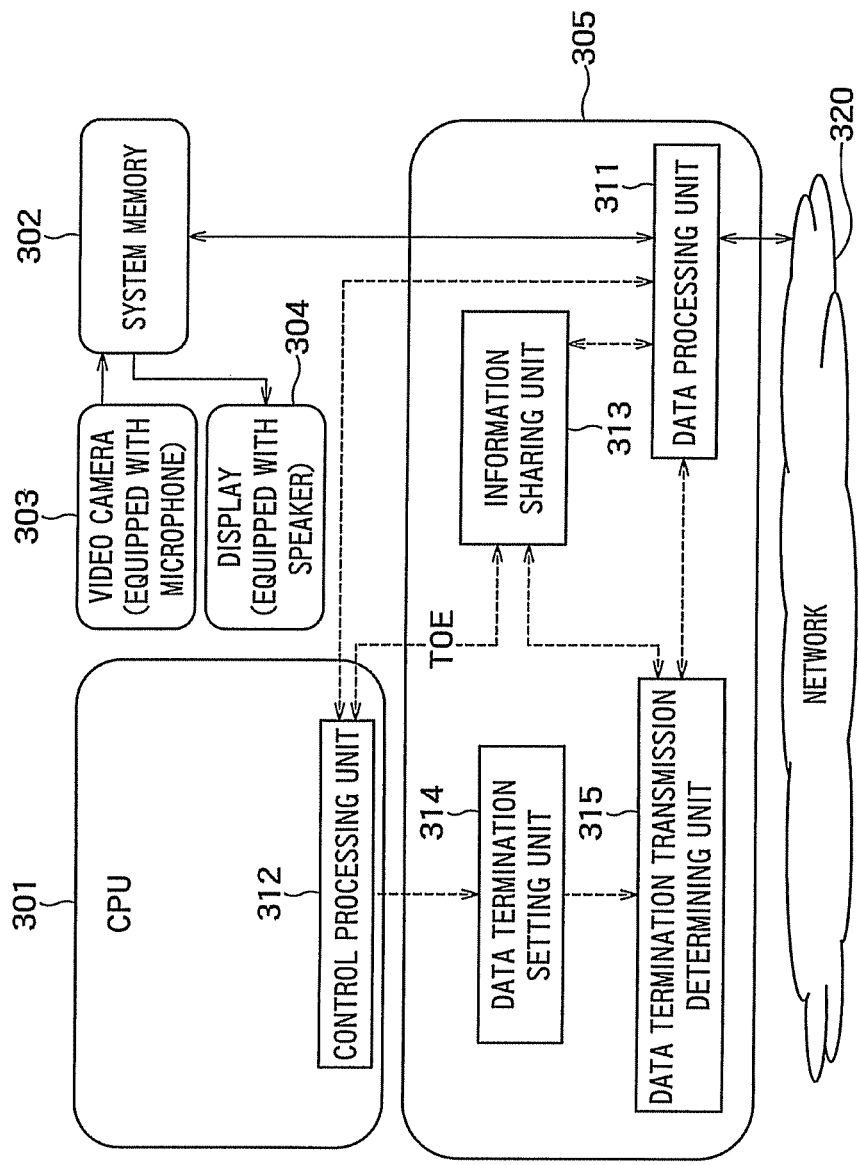
FIG. 16 is a drawing schematically showing a configuration of a data communicating device according to a third embodiment.

FIG. 16 is a block diagram showing a data communicating device according to the third embodiment of the present invention.

The data communicating device according to the third embodiment is a TV phone server, displays video images from a client (outputs also sound from a speaker), and transmits the video images (including input sound from a microphone) taken by a video camera to the client.

This device is composed of a CPU 301, a system memory 302, a microphone-equipped video camera 303, a speaker-equipped display 304, and a TOE 305; and each of these is connected by, for example, a bus such as a local bus or PCI Express, IEEE1394, or HDMI (High-Definition Multimedia Interface). Note that a controller, a decoder, and an encoder of the display are omitted. In the CPU 301, an application about video image display is operated.

The CPU 301 is provided with a control processing unit 312. The TOE 305 is provided with a data processing unit 311, a control processing unit 312, an information sharing unit 313, a data termination setting unit 314, and a data termination transmission determining unit 315.

The data processing unit 311 carries out processing for transmitting/receiving data via a network 320.

The control processing unit 312 controls the state (session state) of the terminal of its own in data communication.

The information sharing unit 313 retains information of a session shared by the control processing unit 312 and the data processing unit 313. The information of the session includes information such as the above described session state and flow control information (for example, window size) used in flow control.

The data termination setting unit 314 generates termination notification data ("FIN" segment), which notifies completion of data transmission (end of session), and instructs the data processing unit 311 to transmit the termination notification data.

The data termination transmission determining unit 315 determines whether the termination notification data can be transmitted to a peer device based on the flow control information of the information sharing unit 313.

Hereinafter, an example in which video image data is transmitted from a client by TCP via a network, the server side of the present device displays the image data expressed by the video image data, and video image data is transmitted to the client from the server in the same TCP session will be explained.

The process until session establishment is similar to the second embodiment; therefore, explanation thereof will be omitted. After a session is established, when the state becomes the "ESTABLISHED" state, video images are transmitted from the client to the server.

The received data is processed by the data processing unit 311 as well as the second embodiment, and the video images are displayed by the display 304 via the system memory 302. On the other hand, data of video images taken by the video camera 303 is transmitted from the present server to the client by using the same TCP session via the network 320.

In the client, when the data is received, the client gives a notification that the data reception has been normally completed. Therefore, the client transmits a segment including "ACK" set as a control flag and the sequence number of the normal reception set as an acknowledgement number.

Figure 17:
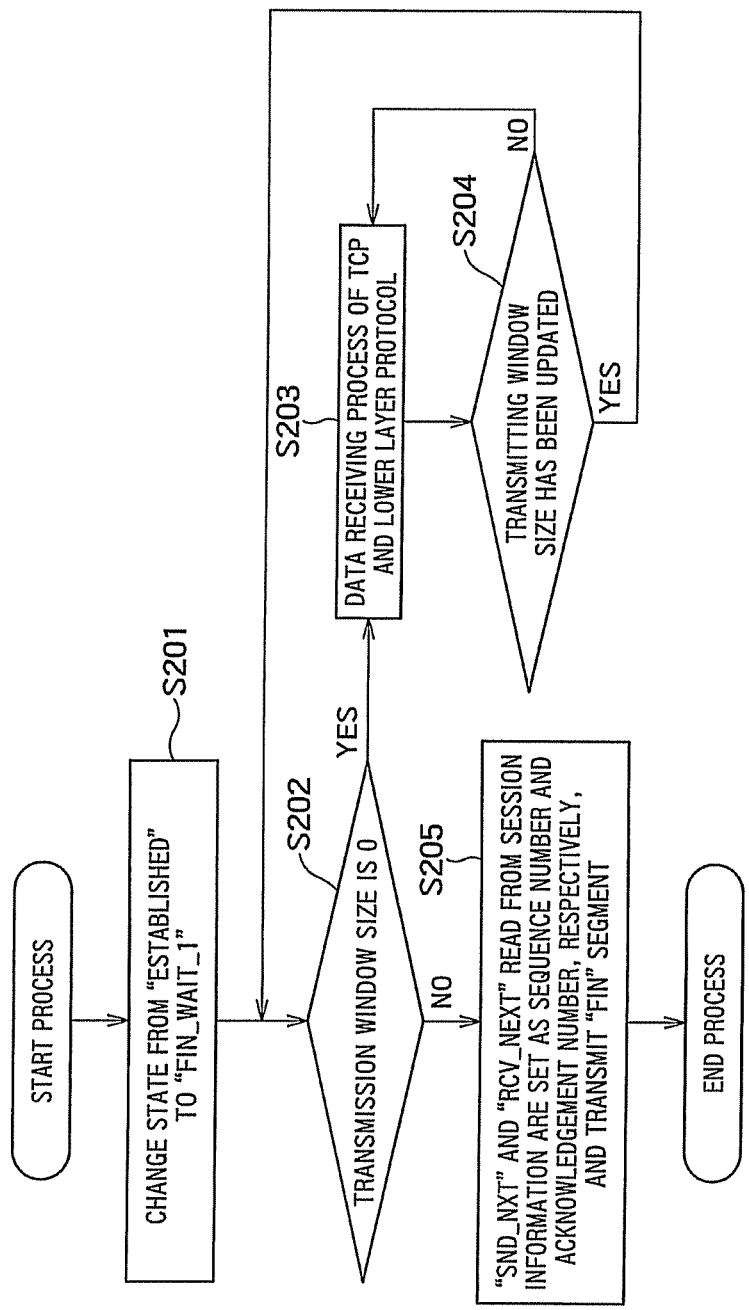
FIG. 17 is a flow chart for explaining operation of the device of FIG. 16.

FIG. 17 is a flow chart showing a session disconnecting operation of the data communicating device according to the third embodiment of the present invention.

When communication is to be finished, a "FIN" segment in which "FIN" is set as a control flag has to be transmitted for disconnecting a TCP session. Hereinafter, the case in which a phone call is disconnected from the server will be taken as an example for explanation.

First, the application operating in the CPU 301 instructs the video camera to stop output of taken video images. Then, the control processing unit 312 changes the session state of the information sharing unit 313 from "ESTABLISHED" to "FIN-WAIT-1" (S201).

Then, the data termination transmission determining unit 315 reads the session information from the information sharing unit 313 and determines whether a transmitting window size "SND_WND" (flow control information) is 0 or not (S202). A "FIN" flag is considered to be data corresponding to one byte in TCP; therefore, if "SND_WND" is 0, the "FIN" segment cannot be transmitted. Therefore, the data termination transmission determining unit 315 determines whether transmission of the "FIN" segment can be carried out or not depending on whether the window size is equal to or larger than 1 byte or not.

If possible, the data termination setting unit 314 instructs the data processing unit 311 to transmit a segment ("FIN" segment) in which "FIN" is set as a control flag. The data processing unit 311, which has received the instruction, reads "RCV_NXT" and "SND_NXT" of the session information of the information sharing unit 313, sets them as the acknowledge number and the sequence number therein, respectively, and transmits the "FIN" segment (S205).

On the other hand, when the transmission cannot be carried out, a process of waiting until a transmitting window is opened is carried out (S203 and NO in S204). In other words, received data is processed by the data processing unit 311 until there is a window update notification from the peer device; and, when the transmitting window size of its own device is updated (YES in S204), the determination is carried out again (S202).

In this manner, when the present embodiment is used, the window size is tested in the TOE, and the "FIN" segment is generated; therefore, the "FIN" segment appropriately reflecting the window size of the peer device can be transmitted. Therefore, the problem that the "FIN" segment cannot be received due to the window size deficit.

Moreover, also in the case in which data is being received from the peer device, wherein "RCV_NXT" of the session information of the information sharing unit 313 is always changed, the acknowledgement number of the "FIN" segment can be correctly set.

In the above described embodiment, the case in which the "FIN" segment is transmitted after the data transmission from the server is stopped is shown. However, the "FIN" segment may be configured to be transmitted in the state in which the data transmission is continued. Also in this case, the sequence number of the "FIN" segment can be correctly set for setting the sequence number in the TOE.

In the above description, the case in which "FIN" is transmitted is explained. However, a segment in which "RST" is set as the control flag may be transmitted by using the data termination setting unit 314. In the case of "RST", the confirmation of the transmitting window size is not required; therefore, the determination in the data termination transmission determining unit 315 is always true.

Figure 18:
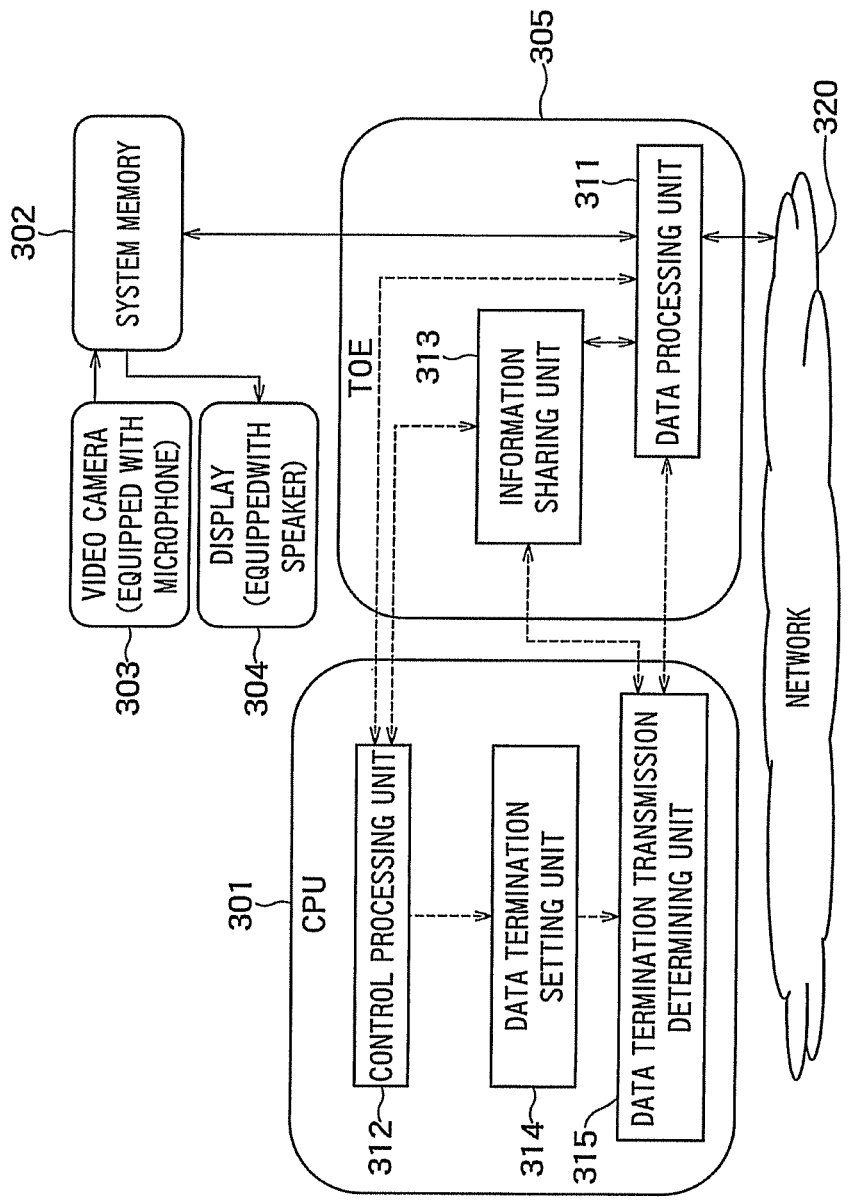
FIG. 18 is a drawing showing a modification example of the device of FIG. 16.

Moreover, as shown in FIG. 18, instead of the TOE 305, the CPU 301 may be provided with the data termination setting unit 314 and the data termination transmission determining unit 315. In this case, a notification may be configured to be given to the data termination transmission determining unit 315 by an interrupt from the data processing unit 311 when the transmitting window size is changed so as to carry out determination whether the "FIN" segment can be transmitted or not. The data termination transmission determining unit 315 may determined whether the transmission can be carried out or not by reading the transmitting window size from the information sharing unit 313 at a certain interval by using a timer or the like.

Hereinabove, the embodiments of the present invention have been explained. The present invention is not limited to the above described embodiments with no change, but can be substantiated in a practical phase by modifying constituent elements without departing from the gist thereof. Moreover, various inventions can be formed by arbitrary combinations of the plurality of constituent elements disclosed in the above described embodiments. For example, some constituent elements may be deleted from all of the constituent elements shown in the embodiments. Furthermore, the constituent elements across different embodiments may be arbitrarily combined.

Moreover, at least part of the devices explained in the above described embodiments may be composed of hardware or may be composed of software. Moreover, the program which realizes at least part of the functions of the devices may be housed in a recording medium such as a flexible disk or a CD-ROM and read and executed by a computer. The recording medium is not limited to a detachable medium such as a magnetic disk or an optical disk, but may be a fixed-type recording medium such as a hard disk device or a memory.

Moreover, the program which realizes at least part of the functions of the devices may be distributed via a communication line (including wireless communication) such as the Internet. Furthermore, the program may be housed in a recording medium or distributed via a wired line or a wireless line such as the Internet in the state in which the program is encrypted, modulated, or compressed.

The invention claimed is:

1. A data transmitting device which divides application data into pieces of data, transmit packets each including data sequentially, and receives acknowledgments of the transmitted packets acknowledgement from a receiving device while carrying out transmission of the packets, comprising:

a data transmission instructing unit which generates a transmitting instruction of the application data;

a data storage unit having a data area and a temporary buffer area, which stores, in the data area, the application data to be transmitted;

a packet transmission instructing unit which sequentially generates packet transmitting instructions based on the transmitting instruction of the application data, each packet transmitting instruction instructing to carry out transmission of one packet;

a data reading unit which reads data corresponding to one packet from the data area of the data storage unit based on the packet transmitting instruction;

a data copying unit which, if the data read by the data reading unit is included within a predetermined length from an end of the application data, saves a copy of the read data in the temporary buffer area of the data storage unit;

a header generating unit which generates a header containing sequence number information of the data read by the packet transmitting instruction;

a packet generating unit which generates the packet based on the header and the data read by the packet transmitting instruction;

a network I/F unit which transmits the packet to the receiving device via a network;

an acknowledgement receiving unit which receives an acknowledgement packet containing acknowledgement sequence number information indicating which data has been received by the receiving device among data contained in the packets transmitted;

a packet retransmission instructing unit which specifies data to be retransmitted according to the acknowledgement sequence number information and gives a retransmitting instruction of the specified data to the data reading unit and the header generating unit;

a transmission completion determining unit which
determines transmission completion of the application data at the time when the data reading unit has read data including the end of the application data and when the acknowledgement receiving unit has received the acknowledgement indicating that all of the data located before a position in the predetermined length back from the end of the application data has been received and notifies the transmission completion of the application data to the data transmission instructing unit; and a copy size specifying unit which specifies the predetermined length to either a total length of data contained in last two packets of the packets including the application data or a total length of data contained in last one packet of the packets, based on the acknowledgment sequence number information and a length of the application data, wherein, when the data transmission instructing unit receives notification of the transmission completion from the transmission completion determining unit, the data transmission instructing unit generates a transmitting instruction of next application data even if an acknowledgement of the data located after the position of the predetermined length back from the end of the application data has not been received and in a case where the data of a sequence number smaller than a sequence number of data at a head of the next application data is transmitted after the transmitting instruction of the next application data is generated, the data reading unit reads the data of the smaller sequence number from the temporary buffer area of the data storage unit, wherein the copy size specifying unit specifies a first length to either a total length of data contained in last two packets of the packets including the application data or a total length of data contained in last one packet of the packets, specifies the predetermined length, based on the first length, a first time being a time taken from when the package generating unit passes the packet to the network I/F unit until the acknowledgment receiving unit receives the acknowledgment of the packet, and a unit length being a length of data transmitted per unit time in data transmission, wherein the predetermined length has a length depending on a value obtained by adding the first length to a product of the first time and the unit length.

2. The device according to claim 1, wherein the predetermined length is a length equal to or shorter than a data interval to carry out the acknowledgement in the receiving device.

3. The device according to claim 2, wherein the predetermined length is a length of the data corresponding to last two packets obtained when the application data is divided into the packets.

4. The device according to claim 1, further comprising a delay measuring unit which measures the time taken from when the packet generating unit passes the packet to the network I/F unit until the acknowledgement receiving unit receives the acknowledgement with respect to the packet;
a transmitting data rate measuring unit which measures the unit length; and
a copy size specifying unit which
increases the predetermined length if the time measured by the delay measuring unit is increased or if the transmitting rate measured by the transmitting rate measuring unit is increased and
reduces the predetermined length if the time measured by the delay measuring unit is reduced or the transmitting rate measured by the transmitting rate measuring unit is reduced.

5. The device according to claim 4, wherein the data transmission instructing unit is configured by first hardware, the data storage unit is configured by a memory,
the packet transmission instructing unit, the data reading unit, the data copying unit, the header generating unit, the packet generating unit, the network I/F unit, the acknowledgment receiving unit, the packet retransmission instructing unit, the transmission completion determining unit, the delay measuring unit, the transmitting data rate measuring unit and the copy size specifying unit are configured by hardware identical to and/or different from the first hardware.

6. The device according to claim 1, further comprising a packet transmission restricting unit which temporarily has the packet transmission instructing unit stop the packet transmitting instruction in a case that it is determined that the data cannot be copied to the temporary buffer area of the data storage unit any more when the packet transmission instructing unit is to instruct transmission of the packet containing the data within the predetermined length from the end of the application data.

7. The device according to claim 6, wherein the packet transmission restricting unit determines that the data cannot be copied to the data storage unit any more when the acknowledgement receiving unit has not received all acknowledgements of immediately preceding application data.

8. The device according to claim 6, further comprising a buffer managing unit; wherein the data storage unit has a plurality of temporary buffer areas;
the buffer managing unit manages address information of the temporary buffer areas;
the temporary buffer areas of the data storage unit store data copies of mutually different pieces of application data, respectively; and
the packet transmission restricting unit determines that the data cannot be copied to the data storage unit any more when all of the temporary buffer areas store the data copies of the pieces of the application data.

9. The device according to claim 6, wherein the buffer managing unit carries out management so that the data copies of the pieces of application data are combined and stored in one of the temporary buffer areas.

10. The device according to claim 1, wherein the data transmission instructing unit is configured by first hardware, the data storage unit is configured by a memory, and
the packet transmission instructing unit, the data reading unit, the data copying unit, the header generating unit, the packet generating unit, the network I/F unit, the acknowledgement receiving unit, the packet retransmission instructing unit and the
transmission completion determining unit are configured by hardware identical to and/or different from the first hardware.

11. The device according to claim 1, wherein the data transmission instructing unit is configured by first hardware, the data storage unit is configured by a memory, and
the packet transmission instructing unit, the data reading unit, the data copying unit, the header generating unit, the packet generating unit, the network I/F unit, the acknowledgement receiving unit, the packet retransmission instructing unit, the transmission completion determining unit and the copy size specifying unit are configured by hardware identical to and/or different from the first hardware.

12. A non-transitory computer readable medium storing a program which, when executed by a computer which divides application data into pieces of data, transmit packets each including data sequentially, and receives acknowledgements of the transmitted packets from a receiving device while carrying out transmission of the packets, causes the computer to perform steps comprising:
generating a transmitting instruction of the application data;
generating packet transmitting instructions based on the transmitting instruction of the application data, each packet transmitting instruction instructing to carry out transmission of one packet;
reading, from a data storage unit having a data area and a temporary buffer area and to store the application data to be transmitted in the data area, data corresponding to one packet from the data area of the data storage unit based on the packet transmitting instruction;
if the read data is data within a predetermined length from an end of the application data, saving a copy of the read data in the temporary buffer area of the data storage unit;
generating a header containing sequence number information of the data read by the packet transmitting instruction;
generating the packet based on the header and the data read by the packet transmitting instruction;
transmitting the generated packet to the receiving device via a network;
receiving an acknowledgement packet containing acknowledgement sequence number information indicating which data has been received by the receiving device among data contained in the packets transmitted;
specifying data to be retransmitted according to the acknowledgement sequence number information and giving a retransmitting instruction of the specified data;
determining transmission completion of the application data at a time when data including the end of the application data is read and when the acknowledgement has been received indicating that all of the data located before a position in the predetermined length back from the end of the application data has been received; and
specifying the predetermined length to either a total length of data contained in last two packets of the packets including the application data or a total length of data contained in last one packet of the packets, based on the acknowledgment sequence number information and a length of the application data;

specifying a first length to either a total length of data contained in last two packets of the packets including the application data or a total length of data contained in last one packet of the packets; and specifying the predetermined length, based on the first length, a first time being a time taken from when the package generating unit passes the packet to the network I/F unit until the acknowledgment receiving unit receives the acknowledgment of the packet, and a unit length being a length of data transmitted per unit time in data transmission, wherein the predetermined length has a length depending on a value obtained by adding the first length to a product of the first time and the unit length, wherein, when the transmission completion of the application data is determined, said generating a transmitting instruction of the application data includes generating a transmitting instruction of next application data even if an acknowledgment of the data located after the position of the predetermined length back from the end of the application has not been received; and, in a case where the data of a sequence number smaller than that of data at a head of the next application data is transmitted after the transmitting instruction of the next application data is generated, the reading includes reading the data of the smaller sequence number from the temporary buffer area of the data storage unit.

13. The device according to claim 12, wherein a first length is specified to either a total length of data contained in last two packets of the packets including the application data or a total length of data contained in last one packet of the packets, the predetermined length is specified, based on the first length, a first time being a time taken from when the packet is passed to the network I/F unit until the acknowledgment of the packet is received, and a unit linked being a length of data transmitted per unit time in data transmission, wherein the predetermined length has a length depending on a value obtained by adding the first length to a product ?f the first time and the unit length.

14. A data communicating device which carries out data communication with another communication device connected via a network, using a TCP protocol that causes to establish a session for communication and carry out retransmission of data from a transmitting side when loss of transmitted data is detected, comprising:

a control processing unit which manages a TCP session state of the data communication with said other communication device;

a data processing unit configured by hardware different from that of the control processing unit wherein the data processing unit carries out transmission and reception to/from said other communication device via the network, and, in a case of carrying out the reception, receives a string of data and process received data;

an information storage unit which stores information on the TCP session state of the data communication therein;

a data termination detecting unit which detects that termination data is received, the termination data showing that transmission of end data of the string of data is completed from the said communication device;

a reception completion determining unit which determines whether all reception of the string of data has been completed or not when the reception of the termination data is detected; and a copy size specifying unit specifies a first length to either a total length of data contained in last two packets of the packets including the application data or a total length of data contained in last one packet of the packets, specifies the predetermined length, based on the first length, a first time being a time taken from when the package generating unit passes the packet to the network I/F unit until the acknowledgment receiving unit receives the acknowledgment of the packet, and a unit length being a length of data transmitted per unit time in data transmission, wherein the predetermined length has a length depending on a value obtained by adding the first length to a product of the first time and the unit length, wherein the data processing unit processes the data received from the said other communication device in accordance with the TCP session state of the data communication stored in the information storage unit; and the control processing unit transitions the TCP session state of the data communication to a finished state when it is determined by the reception completion determining unit that all reception of the string of data has been completed and, when it is determined that all the reception of the string of data has not been completed, does not transition the TCP session state of the data communication to the finished state even if the termination data has been received until it is determined by the reception completion determining unit that all reception of the string of data has been completed.

15. The device according to claim 14, further comprising a notifying unit which transmits notification data indicating that the reception has been completed to the said other communication device when it is determined by the reception completion determining unit that reception of the string of data has been completed.

16. The device according to claim 15, wherein the control processing unit is configured by first hardware, the information storage unit is configured by a memory, and the data processing unit, the data termination detecting unit, the reception completion determining unit and the notifying unit are configured by second hardware.

17. The device according to claim 15, wherein the control processing unit and the reception completion determining unit are configured by first hardware, the information storage unit is configured by a memory, and the data processing unit, the data termination detecting unit and the notifying unit are configured by second hardware.

18. The device according to claim 14, wherein the control processing unit is configured by first hardware, the information storage unit is configured by a memory, and the data processing unit, the data termination detecting unit and the reception completion determining unit is configured by second hardware.

19. The device according to claim 14, wherein the control processing unit and the reception completion determining unit are configured by first hardware, the information storage unit is configured by a memory, and the data processing unit and the data termination detecting unit are configured by second hardware.

20. A non-transitory computer readable medium storing a program which, when executed by a computer to carry out data communication with another communication device connected via a network using a TCP protocol that causes to establish a session for communication and carry carries out retransmission of data from a transmitting side when loss of transmitted data is detected, causes the computer to perform steps comprising:

managing, by control processing unit, a TCP session state of the data communication with said other communication device and storing the TCP session state of the data communication in an information storage unit;

carrying out, by a data processing unit configured by hardware different from that of the control processing unit, transmission and reception to/from said other communication device via the network, and, in a case of carrying out the reception, receiving a string of data and processing received data;

detecting reception of termination data showing that transmission of end data of the string of data is completed from the said other communication device;

determining whether all reception of the string of data has been completed or not when the reception of the termination data is detected;

specifying a first length to either a total length of data contained in last two packets of the packets including the application data or a total length of data contained in last one packet of the packets; and specifying the predetermined length, based on the first length, a first time being a time taken from when the package generating unit passes the packet to the network I/F unit until the acknowledgment receiving unit receives the acknowledgment of the packet, and a unit length being a length of data transmitted per unit time in data transmission, wherein the predetermined length has a length depending on a value obtained by adding the first length to a product of the first time and the unit length, wherein the processing received data includes processing the data received from the said other communication device in accordance with the TCP session state of the data communication stored in the information storage unit; and said managing a session state includes transitioning the TCP session state of the data communication to a finished state when it is determined that all reception of the string of data has been completed and, when it is determined that all the reception of the string of data has not been completed, not transitioning the TCP session state of the data communication to the finished state even if the transmission data has been received until it is determined that all reception of the string of data has been completed.

* * * * *